US012595883B2

(12) United States Patent
Foss et al.

(10) Patent No.: US 12,595,883 B2
(45) Date of Patent: Apr. 7, 2026

(54) PRISMATIC LIQUID HYDROGEN TANK

(71) Applicant: CryoVac AS, Drammen (NO)

(72) Inventors: Stein Foss, Drammen (NO); Sverre Oien, Drammen (NO); Aage Bjorn Andersen, Drammen (NO); Terje Paulsen, Drammen (NO)

(73) Assignee: CryoVac AS (NO)

( * ) Notice: Subject to any disclaimer, the term of this patent is extended or adjusted under 35 U.S.C. 154(b) by 361 days.

(21) Appl. No.: 18/017,387

(22) PCT Filed: Jul. 22, 2021

(86) PCT No.: PCT/EP2021/070548

§ 371 (c)(1),
(2) Date: Jan. 20, 2023

(87) PCT Pub. No.: WO2022/018210

PCT Pub. Date: Jan. 27, 2022

(65) Prior Publication Data

US 2023/0258298 A1 Aug. 17, 2023

(30) Foreign Application Priority Data

Jul. 22, 2020 (GB) ..................................... 2011320

(51) Int. Cl.
*F17C 1/00* (2006.01)

(52) U.S. Cl.
CPC ...... *F17C 1/002* (2013.01); *F17C 2201/0157* (2013.01); *F17C 2203/015* (2013.01);
(Continued)

(58) Field of Classification Search
CPC .. F17C 1/002; F17C 1/005; F17C 1/00; F17C 1/12; F17C 1/14; F17C 1/16; F17C 2201/0157; F17C 2203/03; F17C 2203/0329; F17C 2203/0333; F17C 2203/0391; F17C 2203/06; F17C 2203/0602; F17C 2203/0612; F17C 2203/0626; F17C 2203/0629; F17C 2205/0107; F17C 2205/0111;
(Continued)

(56) References Cited

U.S. PATENT DOCUMENTS 4,282,280 A * 8/1981 Cook, Jr. .............. F17C 13/001
428/116
6,178,754 B1 * 1/2001 Dujarric ................ F17C 13/126
62/45.1

(Continued)

FOREIGN PATENT DOCUMENTS

CN 103608258 A 2/2014
CN 108146583 A 6/2018

(Continued)

OTHER PUBLICATIONS

International Search Report and Written Opinion of the International Searching Authority for PCT Application No. PCT/EP2021/070548 dated Oct. 22, 2021.

*Primary Examiner* — Javier A Pagan
(74) *Attorney, Agent, or Firm* — David F. Dockery; The Navitas Intellectual Property Group LLC

(57) ABSTRACT

A prismatic tank for the containment of liquefied gas. The tank is formed of extruded materials and comprises an outer insulation layer.

22 Claims, 33 Drawing Sheets

A

B

Generic 20' ISO Container frame with CRY-Fuel vacuum insulated tank

(52) U.S. Cl.
CPC ................. *F17C 2203/0333* (2013.01); *F17C 2203/0391* (2013.01); *F17C 2203/0629* (2013.01); *F17C 2203/0646* (2013.01); *F17C 2203/0648* (2013.01); *F17C 2205/0111* (2013.01); *F17C 2205/0138* (2013.01); *F17C 2205/0142* (2013.01); *F17C 2221/012* (2013.01); *F17C 2223/0161* (2013.01); *F17C 2223/033* (2013.01); *F17C 2270/0105* (2013.01)

(58) Field of Classification Search
CPC ........ F17C 2205/013; F17C 2205/0138; F17C 2205/0134; F17C 2205/0142; F17C 2221/012; F17C 2223/0161; F17C 2223/033; F17C 2270/01; F17C 2270/0105
See application file for complete search history.

(56) References Cited

U.S. PATENT DOCUMENTS

| | | | | |
|---|---|---|---|---|
| 8,322,557 | B2 | 12/2012 | Sele et al. | |
| 9,080,724 | B2 | 7/2015 | Sele et al. | |
| 2007/0194051 | A1* | 8/2007 | Bakken | F17C 1/08 222/173 |
| 2018/0312235 | A1* | 11/2018 | Xu | F02M 21/0218 |
| 2023/0228380 | A1 | 7/2023 | Foss et al. | |

FOREIGN PATENT DOCUMENTS

| | | | | |
|---|---|---|---|---|
| EP | 1723053 B1 | | 7/2008 | |
| ES | 2527687 T3 | | 1/2015 | |
| GB | 1409265 A | * | 10/1975 | F17C 3/025 |

* cited by examiner

Generic 20' ISO Container frame with CRY-Fuel vacuum insulated tank

Generic 20' ISO Container frame with CRY-Fuel vacuum insulated tank

PRISMATIC LIQUID HYDROGEN TANK

BACKGROUND

The present invention relates to a tank for containing and transporting liquefied gases, i.e. a containment system for cryogenic liquids. The invention is particularly, but not exclusively, applicable to the storage and transportation (and consumption in the case of fuel) of cryogenic liquids such as liquefied hydrogen and liquefied natural gas (LNG), either as cargo or as fuel.

Transporting such liquefied gases allows for large volumes of gas to be transported in a single journey which reduces pollution and increases transport efficiencies. In order to transport such liquefied gases, an extremely low temperature must be maintained during the journey of the ship.

Maintaining the gases in liquid condition at these low temperatures is achieved by applying thermal insulation to the tanks used to contain the liquefied gases. This is generally in the form of one or more layers of an insulating material such as polyurethane foam which may be sprayed onto the tank surface or mounted in the form of prefabricated panels often including the use of plywood and which prevents the surrounding heat from reaching the cargo tanks and heating the liquefied gas.

Such systems have been successfully used in a variety of gas carrying ships which have been able to safely transport liquefied gases around the world.

However, the inventors have devised a new arrangement that allows liquefied gases at extremely low temperatures to be contained and insulated from the surrounding conditions more efficiently than existing methods. More specifically, an invention described herein allows for the insulation of cargo tanks or fuel tanks at temperatures close to absolute zero i.e. lower than −250 degrees C.

Advantageously, such a system allows gases such as hydrogen or methane to be contained and maintained in a liquid state. Combustion of hydrogen to mechanical energy in a combustion process or conversion of hydrogen to electric energy in a fuel cell only creates water as a waste product and so the ability to contain and use such a fuel provides significant environmental and efficiency advantages. It also allows ship and fleet operators to comply with ever more stringent environmental regulations that may apply to the shipping industry in the future.

The containment system may find it use in land-based sectors as well both for stationary containment as well as for road and rail based transportation.

Other advantages are described herein.

SUMMARY OF THE INVENTION

Aspects of inventions described herein are set out in the accompanying claims.

Viewed from a first aspect of an invention described herein there is provided a prismatic or spheroid tank as set out in the claims.

The present invention relates to an adaptation of a tank that is suitable for containing and transporting liquefied gases at cryogenic temperatures. The ability to contain, for prolonged periods on a ship, such liquefied gases has caused the inventors to deviate from current industry standards in ship tank design and manufacture.

By way of explanation, the design and construction of cargo containment systems and tank types is dictated by THE INTERNATIONAL CODE FOR THE CONSTRUCTION AND EQUIPMENT OF SHIPS CARRYING LIQUEFIED GASES IN BULK ("IGC CODE"), applicable to all gas-carriers, and THE INTERNATIONAL CODE OF SAFETY FOR SHIPS USING GASES OR OTHER LOW-FLASHPOINT FUELS ("IGF CODE"), applicable to ships with gas fueled propulsion and auxiliary systems.

For cargo containment systems in liquefied gas carriers, i.e. ships, special provisions exist.

A cargo containment system is a term used to describe the total arrangement for containing cargo (or fuel as the case may be) and includes the following:

1. A primary barrier (the cargo tank),
2. Secondary barrier (mandatory for type A tanks),
3. Associated thermal insulation,
4. Any intervening spaces (for maintenance), and
5. Adjacent structure, if necessary, for the support of these elements For cargoes carried at temperatures down to −55 degrees C., the ship's hull may act as the secondary barrier and in such cases, it may be a boundary of the hold space within the ship.

The basic cargo tank types utilized on board gas carriers are in accordance with the following definitions:

Independent Tanks—Type "A", "B" and "C"

Independent tanks are completely self-supporting and do not form part of the ship's hull structure. Moreover, they do not contribute to the hull strength of a ship. As defined in the IGC Code, and depending mainly on the design pressure, there are three different types of independent tanks for gas carriers. These are known as:

i) Type «A»;
ii) Type «B»; and
iii) Type «C».

Type «A» Tanks

Type «A» tanks are constructed primarily of flat surfaces. The maximum allowable tank design pressure in the vapour space for this type of system is 0.7 barg. This means cargoes must be carried in a fully refrigerated condition at or near atmospheric pressure (normally below 0.25 barg). This type of tank is self-supporting and requires conventional internal stiffening (similar to normal hull structure of a ship itself).

Type «A» tanks may not be crack propagation resistant. Therefore, in order to ensure safety, in the unlikely event of cargo tank leakage, a secondary containment system is required. This secondary containment system is known as a secondary barrier and is a feature of all ships with Type «A» tanks capable of carrying cargoes below −10-degrees C.

The secondary barrier must be a complete barrier capable of containing the whole tank volume at a defined angle of keel. The IGC Code stipulates that the secondary barrier must be able to contain tank leakage for a period of 15 days.

Type «B» Tanks

Type «B» tanks can be constructed of flat surfaces or they may be of spherical type. This type of containment system is the subject of much more detailed stress analysis compared to Type «A» systems. These controls must include an investigation of fatigue life and a crack propagation analysis.

Because of the enhanced design factors, a Type «B» tank requires only a partial secondary barrier in the form of a drip tray i.e. a tray around and beneath the tank to catch any liquid that escapes.

There are today Type «B» tanks of prismatic shape in LNG service. The prismatic Type «B» tank utilises the ship's main deck space. The maximum design vapour space pressure is, as for Type «A» tanks, limited to 0.7 barg Type «C» Tanks Type «C» tanks are normally spherical or cylindrical pressure vessels having design pressures at 2 barg or higher. The cylindrical vessels may be vertically or horizontally mounted. This type of containment system is always used for semi-pressurized and fully pressurized gas carriers.

Type «C» tanks are designed and built in accordance with relevant pressure vessel codes and subjected to detailed stress analysis. Furthermore, design stresses are kept low. Accordingly, no secondary barrier is required for Type «C» tanks.

Type «C» tanks may be designed for a maximum working pressure of about 18 barg. For a semi-pressurized ship, the cargo tanks and associated equipment are designed for a working pressure of approximately 5 to 7 barg and a vacuum of 0.5 barg. Typically, the tank steels for the semi-pressurized ships are capable of withstanding carriage temperatures down to −104 degrees C. (for ethylene and includes also LPG at −48 degrees C.).

Membrane Tanks

The concept of the membrane containment system is based on a very thin primary barrier (membrane −0.7 to 1.5 mm thick) which is supported through the insulation. Such tanks are not self-supporting like the independent tanks. An inner hull forms the load bearing structure. Membrane containment systems must always be provided with a secondary barrier to ensure the integrity of the total system in the event of primary barrier leakage.

According to an invention described herein, a modified Type B tank is provided. Specifically, an invention described herein provides a prismatic tank that can accommodate 2 barg or more of internal pressure by virtue of an alternative design.

Specifically, viewed from a first aspect of an invention described herein, there is provided a prismatic tank for the containment of a liquefied gas, the tank comprising a plurality of substantially planar side walls defining two opposing ends, two opposing sides and an upper surface opposing a lower surface, the planar side walls defining a volume for containing a liquefied gas, the prismatic tank further comprising edge portions at the intersection of the planar side walls, wherein the edge portions and the planar side walls may be extrusions.

Thus, a tank construction can be provided which is formed of a plurality of extruded components. The use of extrusions allows for a homogeneous component to be formed which allows for optimisation for material use and strength. It also minimises joints and couplings which would disrupt the continuity of strength of the structure.

Advantageously the constructions allow for a hybrid tank construction to be provided which combines the attributes of a type B tank (as described above) with a capability to accommodate internal pressures. A novel tank design is thereby described herein.

In effect the tank construct defines a pressure vessel for the containment of a cryogenic liquefied gas.

As discussed above, the A and B-type tanks are non-pressurised (they can withstand a pressure up to 0.7 barg.) and it is not necessary to take the EU pressure directive or any other requirements/regulations related to pressure vessels into account. The C type tank can withstand a higher pressure (above 0.7 barg) and is by definition a pressure vessel.

The tank construction described herein is neither of the above mentioned—but a novel tank based on a prismatic design and able to withstand pressure of above 2 barg. Consequently, it is a pressure vessel and needs to comply with requirements for such.

The extrusion construction of the prismatic tank allows the structure to be engineered i.e. designed to accommodate a predetermined internal pressure. For example, an internal pressure of 2 barg or more may be accommodated inside such a tank by selecting the cross-sections of the components forming the tank to provide the required strength in terms of stress, strain and safety margins. Reinforcements within the tank itself may also be included and combined as measure to prevent swashing/sloshing and thereby allowing the tank also to be filled at any level.

Advantageously the construct described herein allows for a prismatic tank that does not require a secondary barrier; this becoming an optional addition.

The sub-components forming the tank may be dissimilar materials, for example the walls and edge portions may be different materials to accommodate the predetermined loads. However, advantageously the materials may be the same i.e. common materials. This advantageously allows for continuity of thermal expansion, more reliable welding or joining and additionally the use of techniques such as friction stir welding (FSW) which enhance weld strength further.

Any suitable material may be used. Advantageously however aluminium or an alloy thereof may be used to optimise strength whilst minimising weight of the tank.

The planar side walls of the tank may be formed of single or multiple extrusions welded together. Advantageously forming the planar sections of the tank from multiple sections welded together allows for a number of manufacturing and technical advantages including, but not limited to:

- the use of smaller extrusion machines to form the prismatic tank. This increases the flexibility of where a tank can be manufactured;
- lower cost manufacture; and
- the ability to construct larger tanks according to the methods described herein. For example, when used as a fuel tank application a very large tank may be built for installation into the hull of a ship to contain fuel.

The edge sections may have a cross-sectional shape having a first edge for connection to a first side wall and a second edge for connection to an adjacent side wall, the first and second edges being arranged at 90 degrees to one another and wherein the first and second edges define a weld line along which a side wall may be welded.

Thus, a corner section may be provided which may also be conveniently extruded. The 90 degrees of each corner or edge section provide for a box or rectangular shape tank. It will be recognised that other angles may be used to allow the tank to fit into different applications. For an ISO container discussed herein a 90-degree angle conveniently allows the tank to follow the internal space defined by the container frame dimensions.

The edges also provide a convenient straight line along which a weld may be formed. Because of the pressurised nature of the tank described herein, the inventors have established that ensuring the weld lines are each displaced from the intersection point of the first side wall and adjacent side wall, this advantageously allows the edges and corners to be optimised in terms of extruded profile without incorporating a weld. Such a weld would be detrimental to the strength of the joint between adjacent panels at points of high stress. Any suitable displacement may be used such as, for example at least 10 cm which advantageously controls the loads within the edge and corner portions.

The edge portions in cross-section may be in the form of two perpendicular portions, the perpendicular portions being for connection to an associated planar side wall, and an intermediate portion connecting the two perpendicular portions, wherein the intermediate portion is arranged at 45 degrees to each of the two perpendicular portions. Thus, a truncated corner is provided which may also be extruded. This advantageously also optimises the strength of the edge or corner.

Further strength may additionally be provided by forming wherein a radius is provided at the point at which the intermediate portion intersects with a perpendicular portion.

As discussed above different welding technologies may be used. Advantageously the weld joins may be formed using friction stir welding (FSW), i.e. the edge portions and planar side walls are connected together by a FSW. This provides an extremely strong weld without melting the materials.

The tank may also be provided with an insulation layer surrounding the tank and allowing cryogenic liquids to be contained within the tank. Aspects of the insulation will now be described.

In one arrangement the tank may further comprise an outer insulation layer arranged on the outer surfaces of the substantially planar surfaces and on the outer surfaces of the edge sections.

The insulating material may be in the form of an insulation foam.

The insulation layer may be in the form of a coaxial sleeve or sleeves defining a space around the prismatic tank to receive the insulation material. In another arrangement the insulation layer may be in the form of a plurality of tessellating insulation panels. Thus, any shape of prismatic tank may be fully insulated.

For example, the insulation layer may be in the form of a modular insulation arrangement comprising one or more tessellating insulation units, each unit comprising a first inwardly facing layer and a second outwardly facing layer spaced from the first layer, the two layers defining a space there between and one or more spacing members extending between the first and second layers, and wherein the surfaces defining the first layer, the second layer and the outer perimeter extending around the arrangement are air impermeable surfaces.

Furthermore, the space between the first and second layers and the surface defining the outer perimeter of the arrangement may define an internal volume to the arrangement and wherein the spacing members are arranged in use to resist atmospheric pressure acting on the surfaces when the internal volume is evacuated of air.

Thus, a vacuum insulation arrangement may be provided in combination with the novel tank construction. This would allow cryogenic liquids (such as cargo or fuel) to be contained within such a prismatic tank.

Furthermore, to allow for the convenient transport, loading and unloading of prismatic tanks described herein the tank may advantageously be contained within an ISO container frame complying with ISO dimension regulations (described herein).

Still further, the tank arrangement may comprise a peripheral frame allowing for selective coupling to similar frames such that multiple prismatic tanks may be coupled together in stacks or matrices.

To allow for the convenient loading and unloading of tanks an inlet and outer port may be provided to allow cargo and/or fuel to be loaded into the tank and removed therefrom. Advantageously adjacent tanks may be provided with pre-configured conduits to allow for simultaneous loading and unloading of tanks. This may be particularly useful to expedient liquid transfer or in fuel application where a continuous flow of fuel is required.

Multiple tanks as described above may then be conveniently arranged in a matrix on board or inside a ship.

Viewed from another aspect of an invention described herein, there is provided a fuel tank for a ship wherein the tank has a prismatic structure for the containment of a liquefied gas, the tank comprising a plurality of substantially planar side walls defining two opposing ends, two opposing sides and an upper surface opposing a lower surface, the planar side walls defining a volume for containing a liquefied gas, the prismatic tank further comprising edge portions at the intersection of the planar side walls, wherein the edge portions and the planar side walls are extrusions Viewed from a still further aspect there is provided a ship containing a prismatic tank as described herein.

DRAWINGS

Aspects of the invention will now be described, by way of example only, with reference to the accompanying figures in which:

FIG. 11B is an expanded view of a corner section of the ship's tank;

FIG. 1126 shows a cross-section through the perimeter thermal isolation arrangement;

Figure 121:
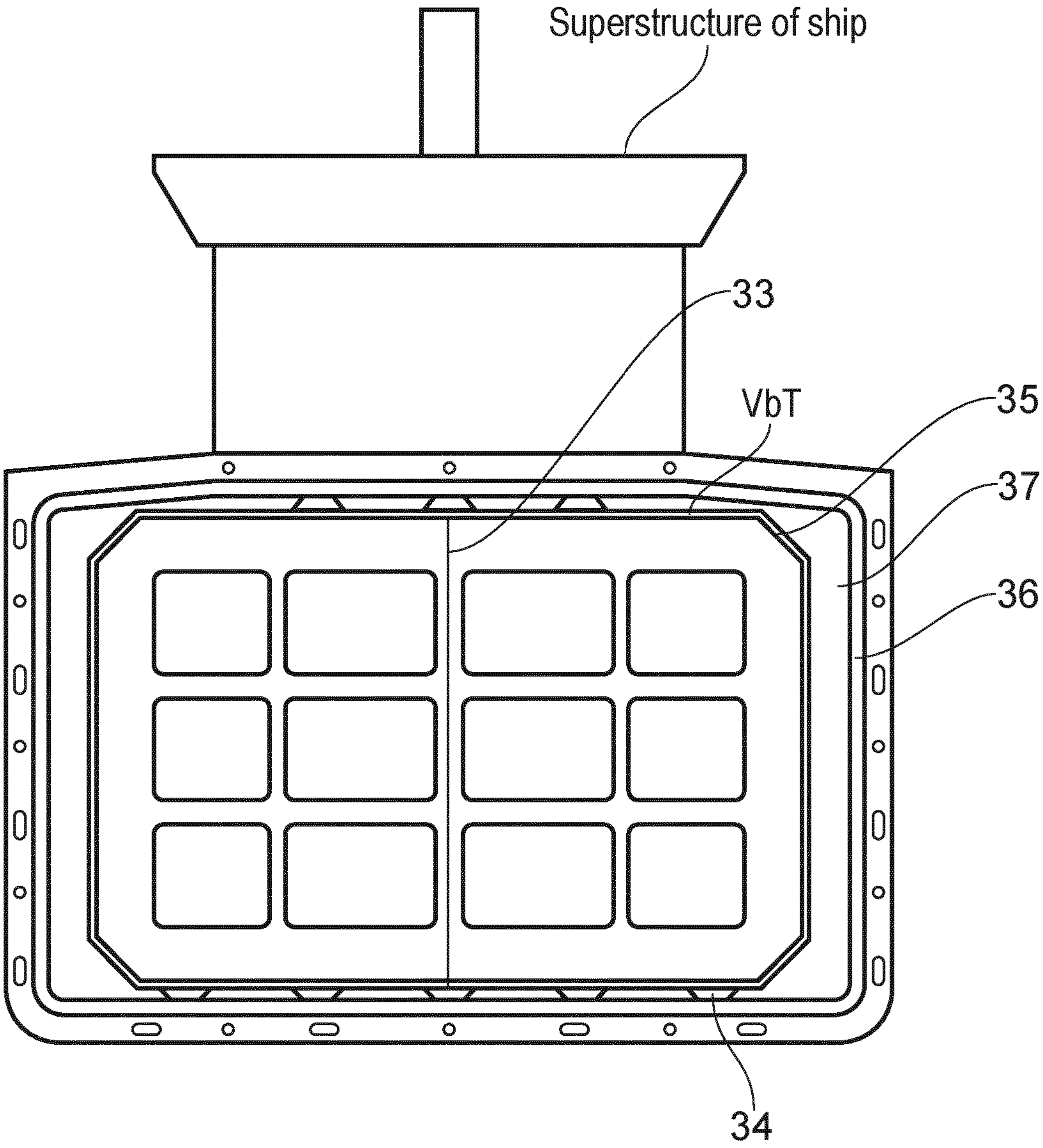
Figure 122:
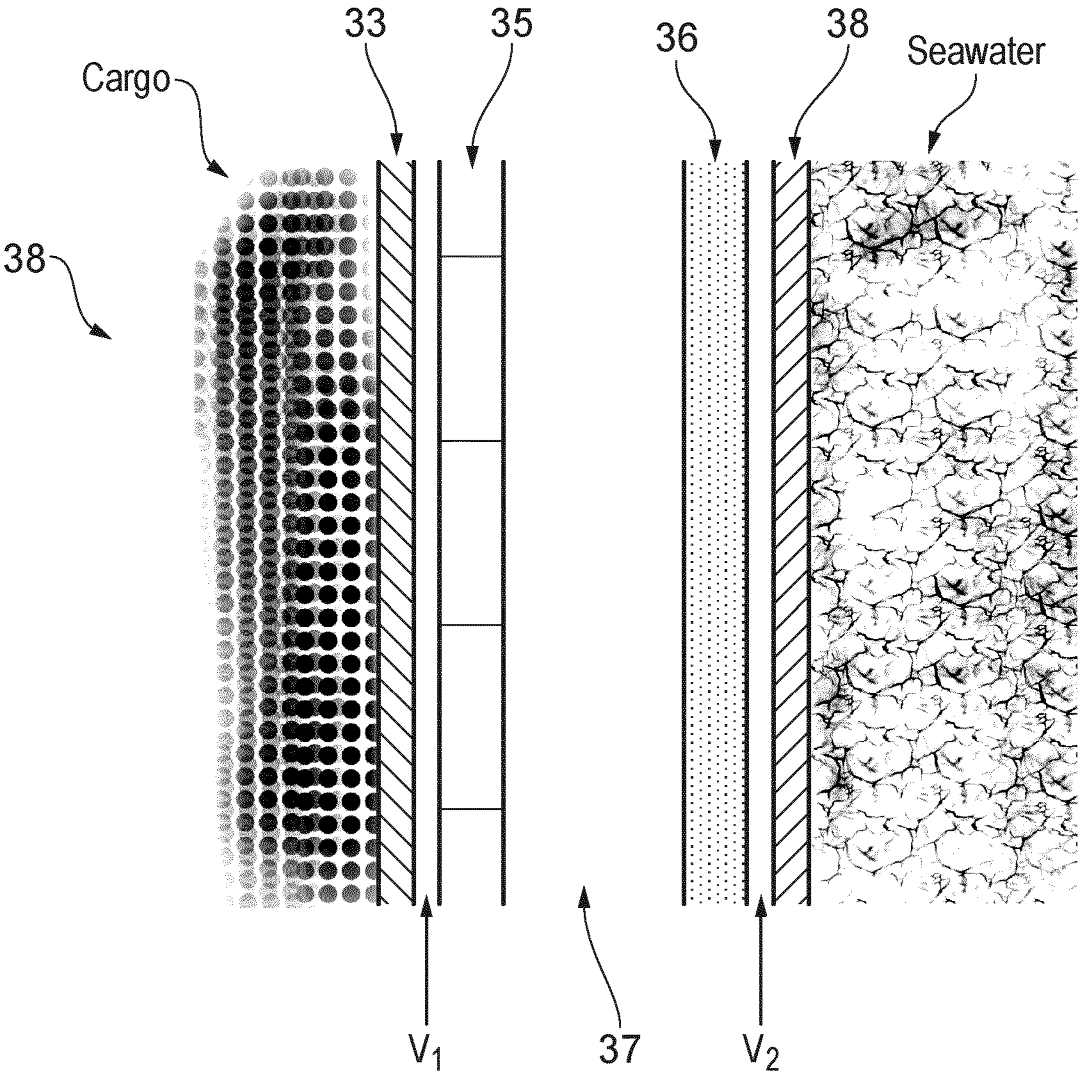
Figure 123:
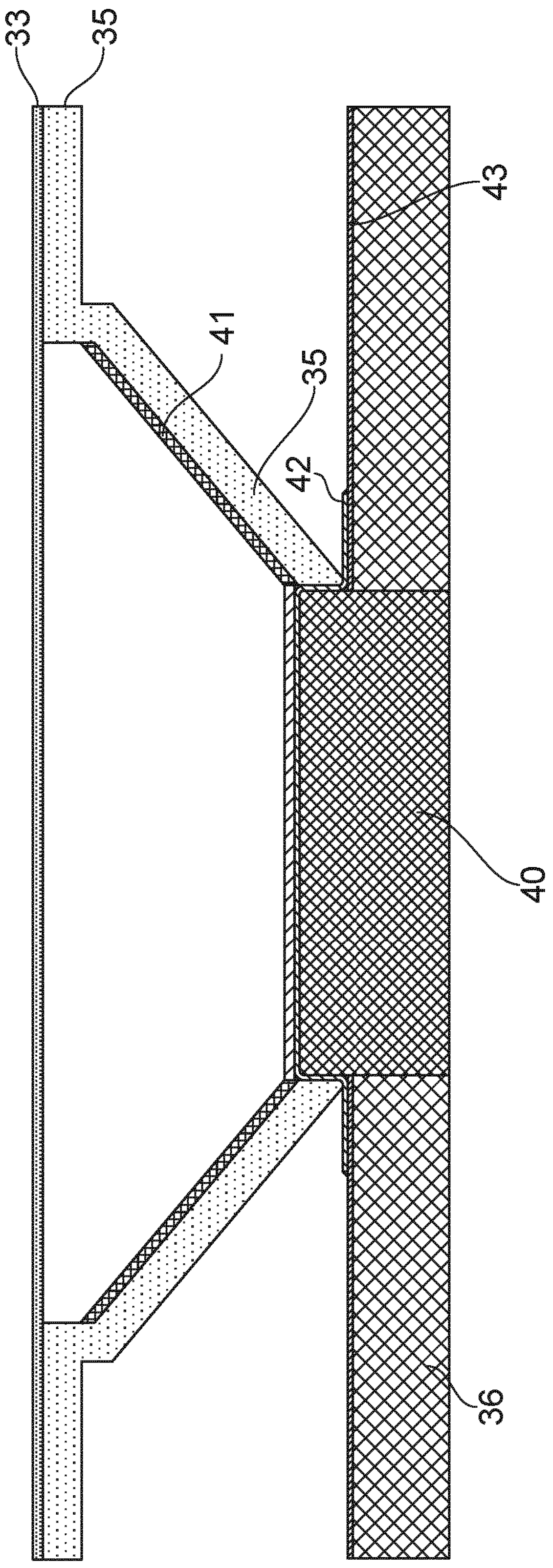

FIGS. 121, 122 and 123 show further examples of the insulation and transportation according to inventions described herein While the invention is susceptible to various modifications and alternative forms, specific embodiments are shown by way of example in the drawings and are herein described in detail. It should be understood however that the drawings and detailed description attached hereto are not intended to limit the invention to the particular form disclosed but rather the intention is to cover all modifications, equivalents and alternatives falling within the spirit and scope of the claimed invention.

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The invention is further described with reference to the following examples. It will be appreciated that the invention as claimed is not intended to be limited in any way by these examples. It will also be recognised that the invention covers not only individual embodiments but also combination of the embodiments described herein.

The various embodiments described herein are presented only to assist in understanding and teaching the claimed features. These embodiments are provided as a representative sample of embodiments only and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the spirit and scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

It will be recognised that the features of the aspects of the invention(s) described herein can conveniently and interchangeably be used in any suitable combination.

DETAILED DESCRIPTION

Figure 1:
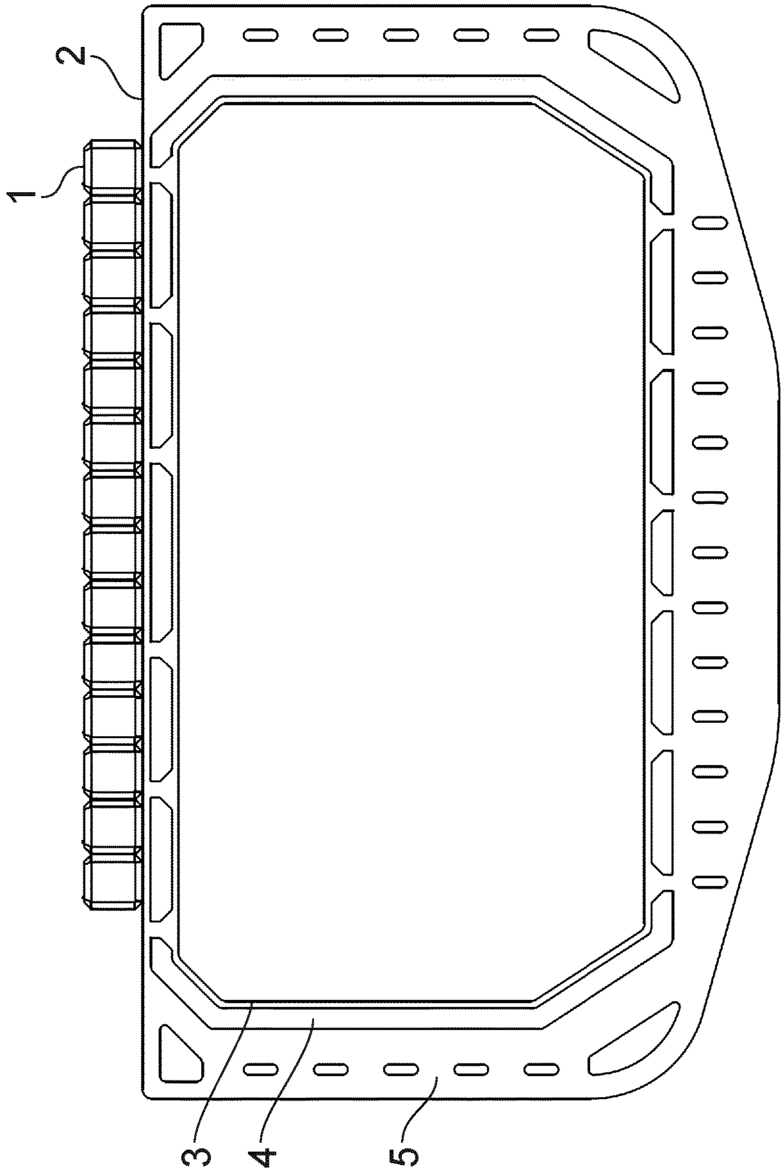
FIG. 1 shows a cross-section through a ship which may incorporate an invention described herein.

FIG. 1 shows a cross-section through a ship's hull. Cargo containers 1 are located onto the deck 2 of the ship. Many layers of containers may be carried on deck or in a vessel's hull and cargo holds for transportation around the world.

In the cross-section shown, the hull of the ship contains a tank 3 which may contain additional cargo in a liquid form. In the example shown the tank is provided with insulation around the outer surface of the tank and a void 4 between the tank 3 and the structure of the hull 5. The void allows for inspection of the insulation. This arrangement is a conventional arrangement used on ships and involves a sprayed layer of insulating foam being applied to the outer surface of the tank to insulate the contents. Insulating the tank allows the contents of the tank to be maintained at specific temperatures.

Between the tank and the insulation around its outer surface, a small void may be created. The atmosphere of this void will cause condensation due to the very low temperatures of the tank wall facing the insulation if its thermal point of condensation is higher than that of the tanks outer surface. To avoid this, the small void may be filled with a gas that will not condensate at temperatures of that of the outer tank wall, i.e. <−250 degrees C. such a gas may be Helium (He) or hydrogen ($H_2$). Alternatively, the void may be evacuated of any gas by the introduction of vacuum. The void may also be left without any measures employed for avoiding condensation. In this case, depending on the atmosphere, condensation in the void may occur forming a layer of ice onto the outer surface of the tank and the inside of the panel. This layer will grow until its outer surface facing away from the tank surface reaches a temperature higher than that of the point of condensation of the atmosphere of the void. The formation of ice may act as an insulation layer.

The cargo containers 1 shown in FIG. 1 may comply with specific established international standards on dimension. Different standards exist for freight containers. One standard is the International Standards Organisation (ISO) standard 668:2020. These standards define the sizes and dimensions of containers.

The advantage of ISO containers for cargo is that they can all be loaded onto a ship and securely locked together with no spaces between adjacent containers. This maximises the space utilised on the ship. They can also be conveniently loaded, unloaded and transported at ports around the world that are set up to conform to the specific standard.

As described herein the inventors have devised a prismatic tank that may comply with the ISO standards for dimensions which thereby conveniently allows it to be used within the normal transportation chains for conventional cargo. As also described herein, the new tank arrangement allows for the containment of liquefied gases to extremely low temperatures.

The tank structure and construction will now be described.

FIGS. 2A, 2B and 2C show the subcomponents which form the tank body itself. As shown the construction of the tank is modular and comprises a plurality of perimeter frame sections (shown in FIG. 2B) and a plurality of substantially planar sections (shown in FIG. 2C). The frame sections and planar sections are brought together to form the tank (shown in FIG. 2A).

The individual components will now be described.

Referring to FIG. 2C the planar sections are shown. These sections are each extruded aluminium planar bodies which extend along the length of each side of the tank. The width of each extrusion, denoted by w in FIG. 2C, determines if any joints are required between each extrusion to form the side or end faces of the tank surface. As illustrated in FIG. 2C two extrusions may make up the side surface of the tank. Similarly, as shown two extrusions may make up each end surface and the top and bottom of the tank.

Extruding the planar sections allows for optimised geometries of the surfaces to be provided. For example, the outer edges of each planar section may be thicker than the central region to allow for more convenient bonding, joining or welding of the sections together whilst minimising material consumption and weight but at the same time maintaining necessary strength. Other cross-sections of the planar sections may equally be provided using conventional extrusion techniques.

Aluminium advantageously provides the strength required for the surfaces with minimal weight. It also advantageously provides surfaces of the tank which are less prone to corrosion which is particularly advantageous when the tanks are transported by ship. Still further, aluminium alloys retain their mechanical properties at low temperatures and thereby allow for convenient manufacture and also strength.

Turning to FIG. 2B the perimeter frame sections are shown. The perimeter frame sections define the edges of the prismatic tank and provide the means to connect the sides, top, bottom and end surface to define the boundary walls of the tank.

As with the planar sections the perimeter frame sections can also be extruded and thereby benefit from the same advantages as described above. Specifically, the cross-section of the frame sections can be optimised for strength.

The frame sections also advantageously allow the points or lines along which the frame is connected to an adjacent planar section to be optimised. Specifically, by providing extruded frame sections, the integrity of the connection can be extremely high owing to the continuous nature of the extrusion. Additionally, the cross-section of the extruded frame can be optimised for strength, weight and for coupling to the adjacent planar sections.

The frame sections will now be described in more detail with reference to FIGS. 3A, 3B and 3C.

FIGS. 3A, 3B and 3C show the corners and side elevation of a corner section. As shown, the corner sections comprise a vertical component extending from the bottom to the top of the tank and two horizontal components arranged at 90 degrees to each other to define the side and end edges.

Owing to the build-up of pressure within the tank potentially caused by vaporisation, the tanks are prone to elevated stress concentrations. It is for this reason that prismatic tanks are typically not used for pressure applications. However, the inventors have established that using an extruded frame cross-section such as that shown in FIG. 3A, the force which the section, and thereby the joint can withstand, can be extremely high. Specifically, the geometry of the frame sections is such that the points or lines along which the planar sections are joined (welded) to the frame sections can be located away from the zones of extremely high stress.

As illustrated in FIG. 3A the weld point $W_p$ can be moved away from the corner or turning point of the material making the frame. As shown, by moving the weld point by a distance d from the corner region of the frame section the position at which a weld is made is moved away from the area of greatest stress.

This advantageously increases the structural integrity of the edges of the tank, allows for a weld with greater integrity and allows the thickness of the cross-section to be optimised for strength and weight.

Furthermore, moving the weld point of line to a flat area of the tank allows welding techniques such as friction stir welding (FSW) to be used. FSW is advantageous in such a tank application because a highly homogenous and continuous weld can be formed between the frame sections and the adjacent planar sections.

This allows for a high integrity corner and edge joint around the perimeter of the tank.

The corner sections as shown in FIG. 3B may be pressed to create a curved corner at each of the 4 corners of the tank. The number of corners will of course depend on the selected geometry of the tank and may therefore be greater than 4.

Still further the same FSW technique can advantageously be used to join adjacent planar sections together.

Thus, a high integrity tank formed of extruded sub-components can be provided. The simplicity of extrusion allows the tanks to be manufactured in a cost-effective manner and with high accuracy. Coupled with the high integrity joints between the modular components forming the tank, a high strength and durable tank can be provided for ocean going transport of liquefied gases or the like.

The tank may be formed conveniently by bringing together a plurality of the extrusions described above and then welded together.

Figure 4:
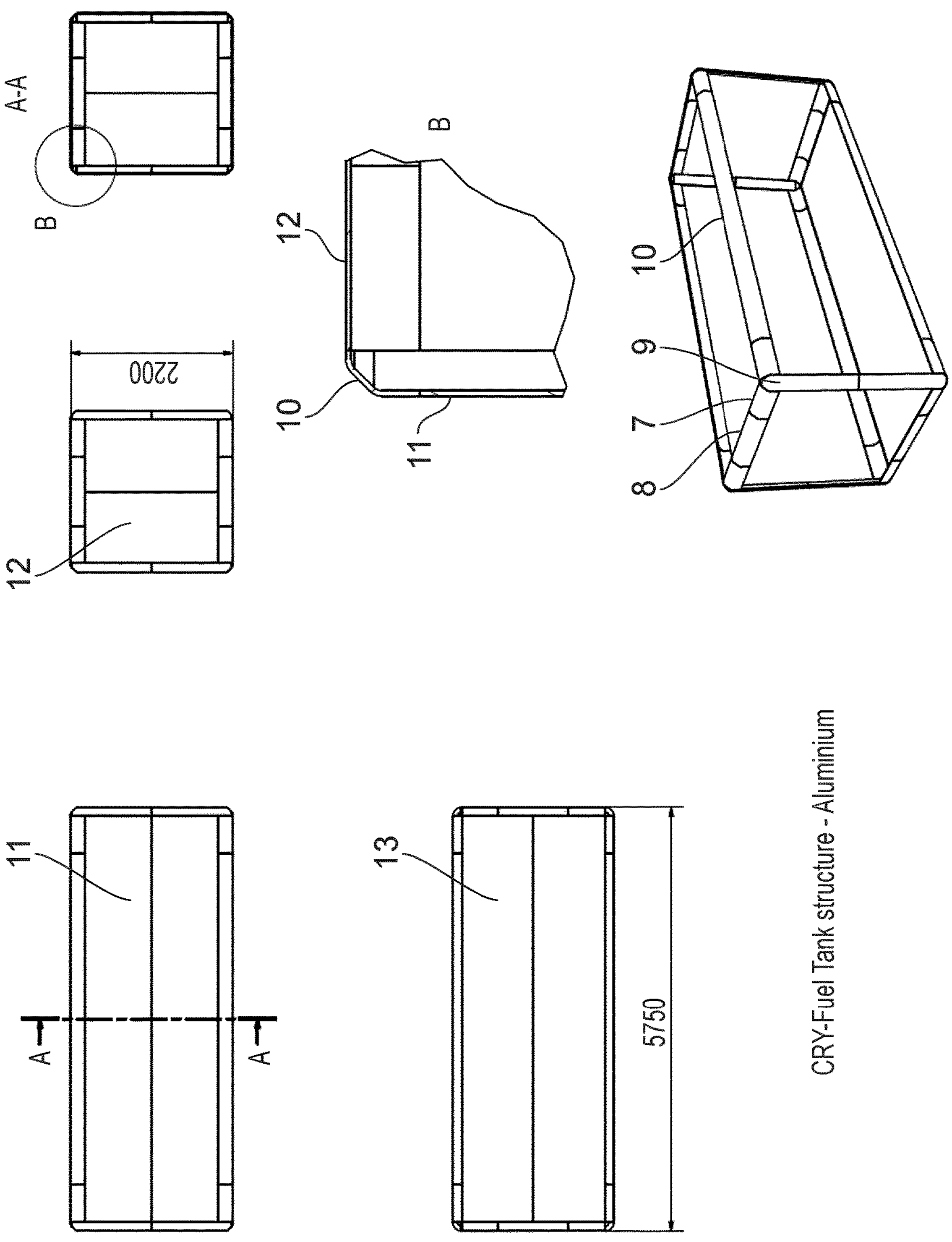
FIG. 4 shows an alternative view of the sub-components of the tank described herein.

FIG. 4 illustrates side, top and end views of the tank described herein. The individual sub-components are shown by the reference numerals as follows:

7 extruded profile corner;
8 extruded beam (short);
9 extruded corner;
10 extruded beam (long);
11 extruded panel (tank wall);
12 extruded panel (tank wall); and
13 extruded panel (top/bottom).

It will be recognised that other welding techniques may also be conveniently applied to the modular arrangement described herein.

The figures describe details of the construction of the tank body which contains the liquefied cargo or fuel (in a fuel tank application). Aspects of the insulation that may be applied to the tank body will now be described as follows.

Figure 5:
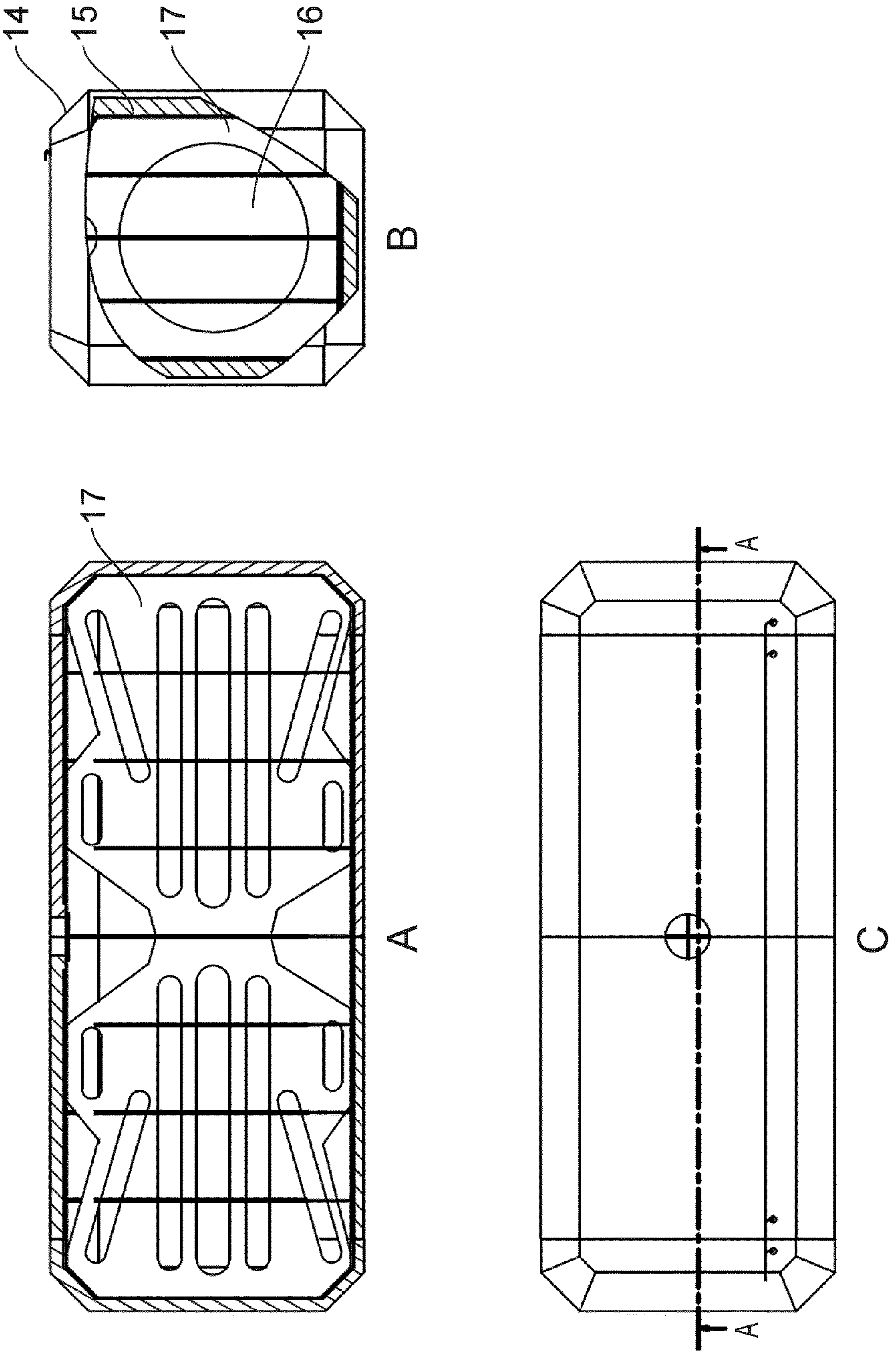
FIGS. 5A, 5B and 5C show a cross-section through a prismatic tank, insulation and internal reinforcement.

FIG. 5 shows a cross-section through the tank (5A), a partial cross-section (5B) and a plan view (5C) of a tank described herein. FIG. 5A is a cross-section through section A-A' in FIG. 5C.

Figure 2:
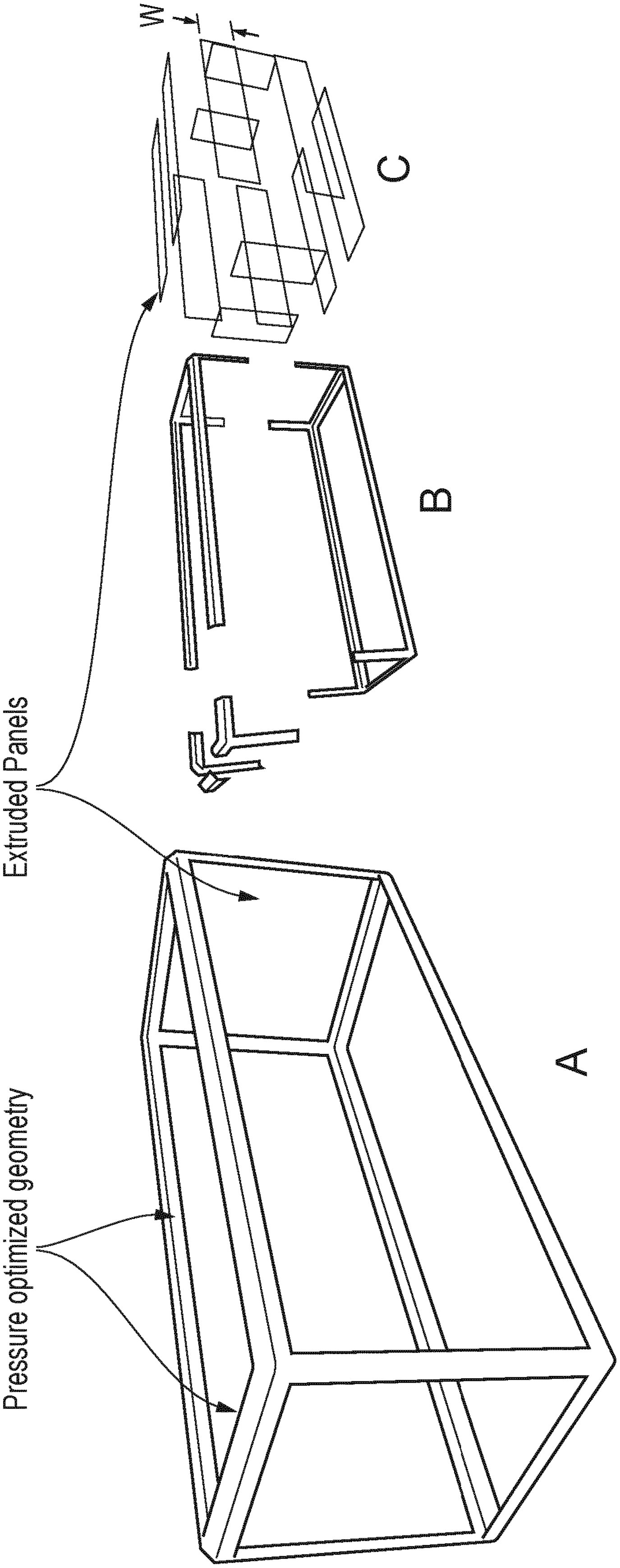
FIG. 2 shows the sub-components of a prismatic tank described herein.
Figure 3:
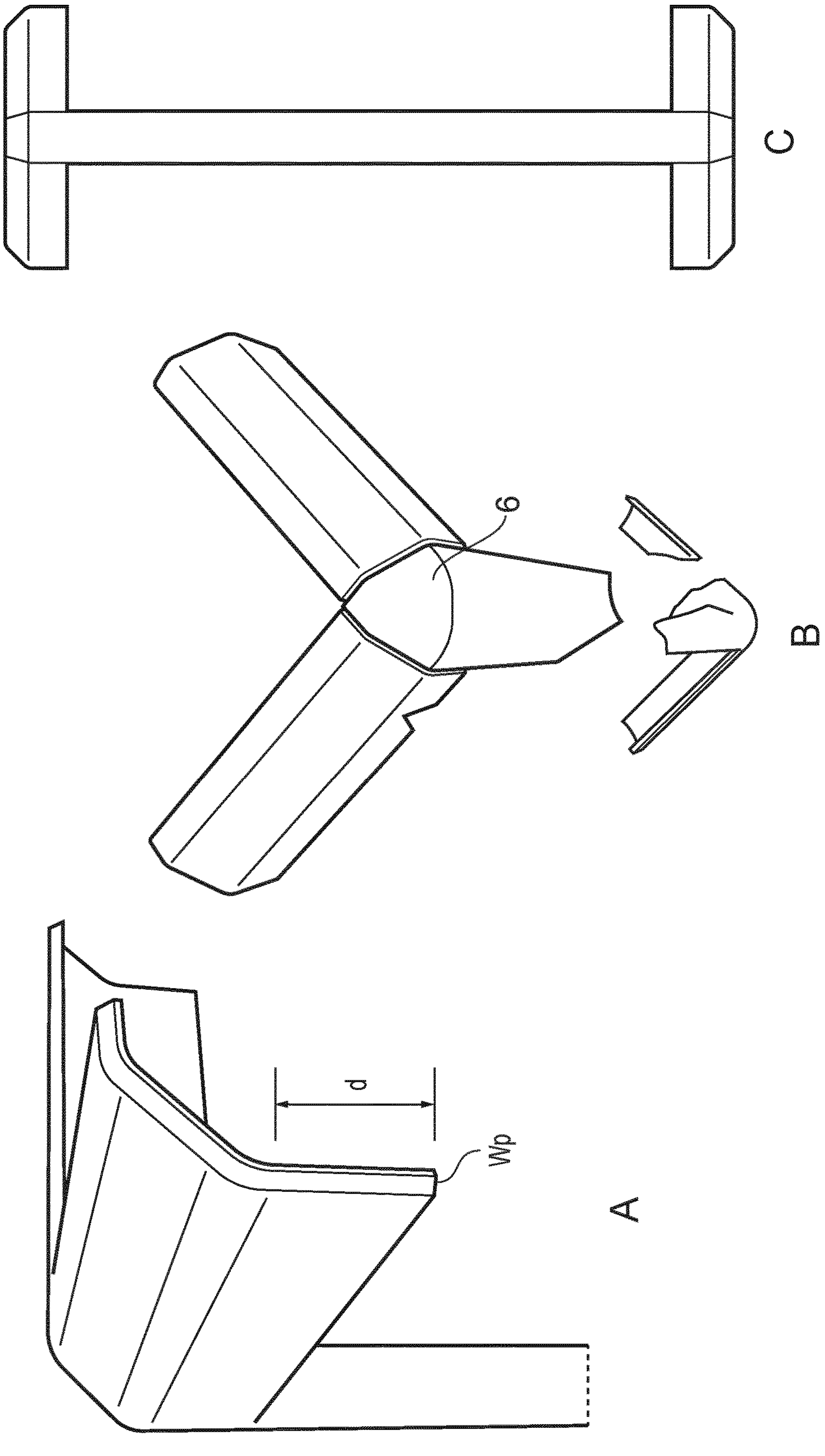
FIGS. 3A, 3B and 3C show the edge profiles of a tank described herein.

The tank body as described in FIGS. 2 to 4 is surrounded by an insulation layer 14 which is located against the tank 15 outer surface. The tank contains a cargo/fuel 16.

The inner volume of the tank may be an empty void to receive the cargo/fuel or may incorporate a series of perforation cross-members or surfaces 17.

Arranging a plurality of internal surfaces or ribs 17 which extend between the inner walls of the tank can advantageously provide a number of advantages:

- First, the surfaces or ribs can increase the structural rigidity of the tank;
- Second, increasing the rigidity allows the tank to accommodate greater pressure loads both internally and externally;

Third, by making the internal structure stronger the wall thickness of the tank can be reduced and optimised; and The internal structures or ribs can advantageously prevent or reduce movement of liquid (sometimes referred to as 'sloshing') within the tank which are undesirable when moving a tank of liquid.

Specifics of the insulation layer 14 are described in more detail below.

Figure 6:
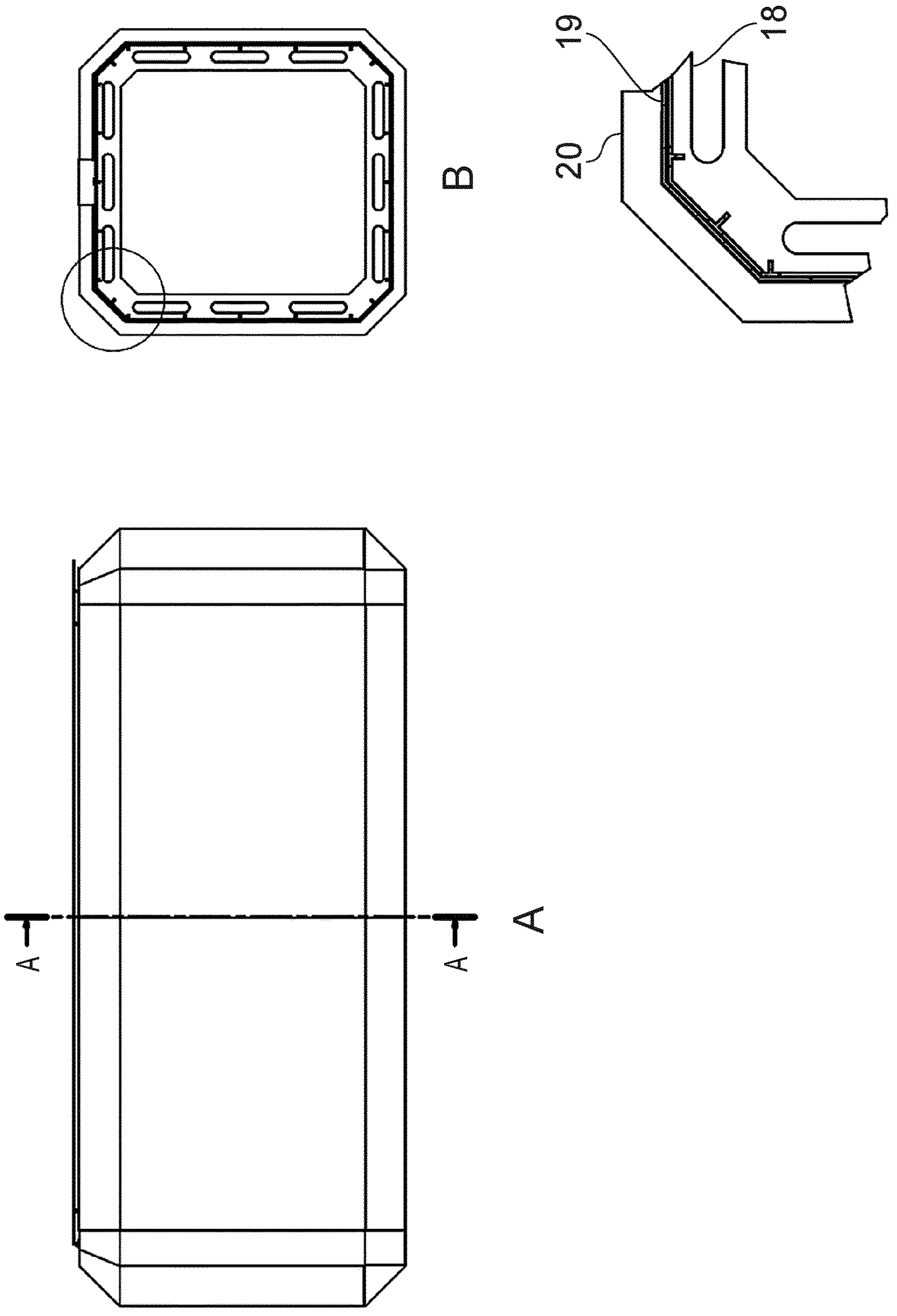
FIGS. 6A, 6B and 6C show a cross-section through a tank with an alternative reinforcement arrangement.

Turning to FIGS. 6A, 6B and 6C, these figures illustrate the corner of the tank in cross-section. FIG. 6B is a cross-section through section A-A' in FIG. 6A. FIG. 6C illustrates an enlarged view of the corner of the tank structure. As shown, an internal rib 18 extends around the inner wall of the tank providing a circumferential reinforcement of the tank. The rib 18 also acts to advantageously reduce sloshing movement of the liquid but in this example extends across the tank as opposed to along the tank in the example of the ribs shown in FIG. 5A.

In FIG. 6C the tank wall 19 is shown which is surrounded by the secondary barrier or insulation layer 20. The insulation layer 20 is arranged to entirely encapsulate the tank (with the exception of loading and unloading port(s)) so as to fully insulate the tank from external ambient temperature.

Figure 7:
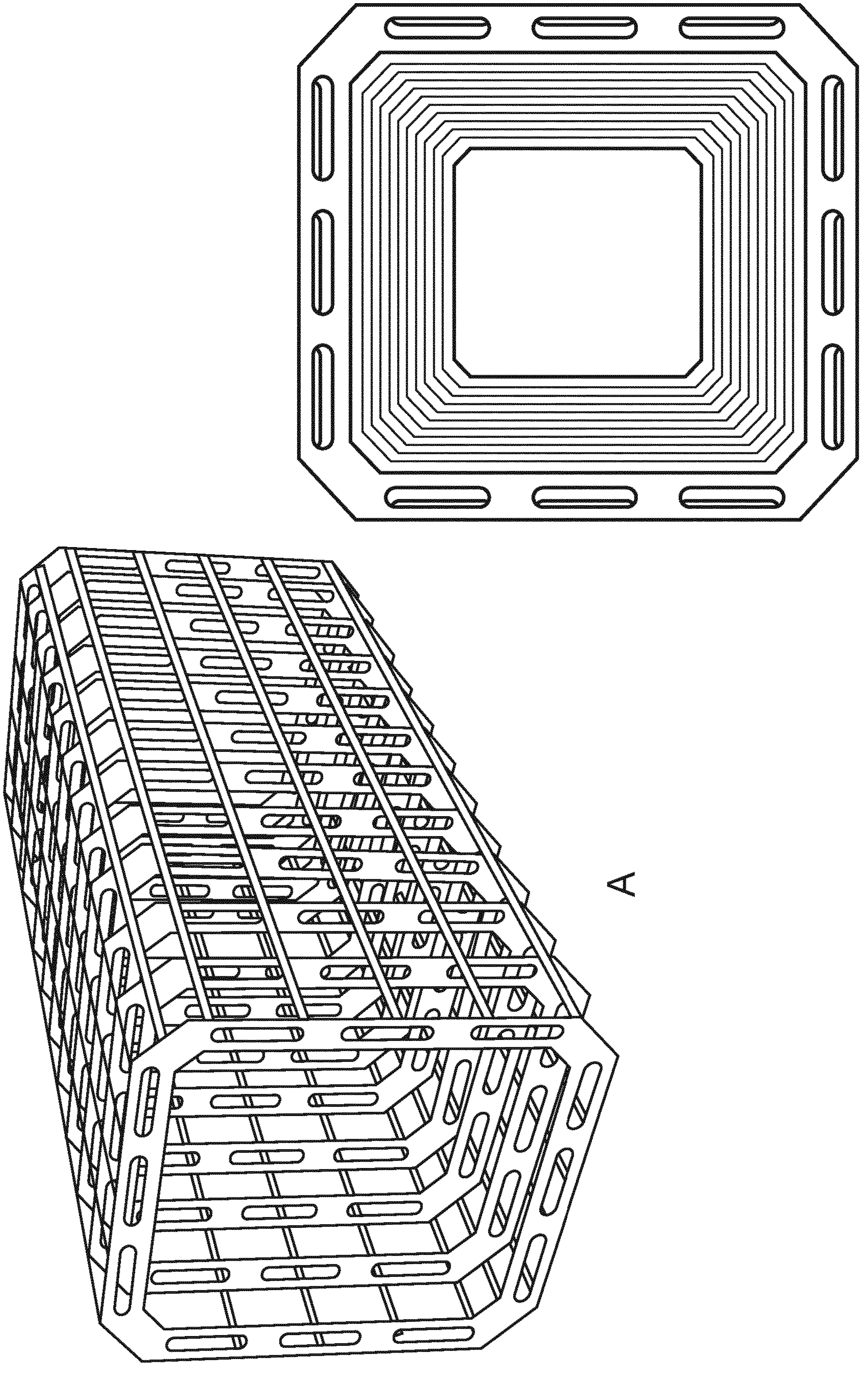
FIGS. 7A and 7B show the reinforcement arrangement shown in FIGS. 6A-6C.

FIGS. 7A and 7B show the reinforcement structure within the tank (in one example) using a plurality of ribs 18 shown in FIGS. 6B and 6C. It will be recognised that such a structure within the tank provides an extremely rigid tank. Each rib many be advantageously extruded or cut from aluminium and conveniently bolted or welded together to make the structure. These ribs may at an interval deviate in dimensions to more efficiently mitigate against sloshing.

Figure 8:
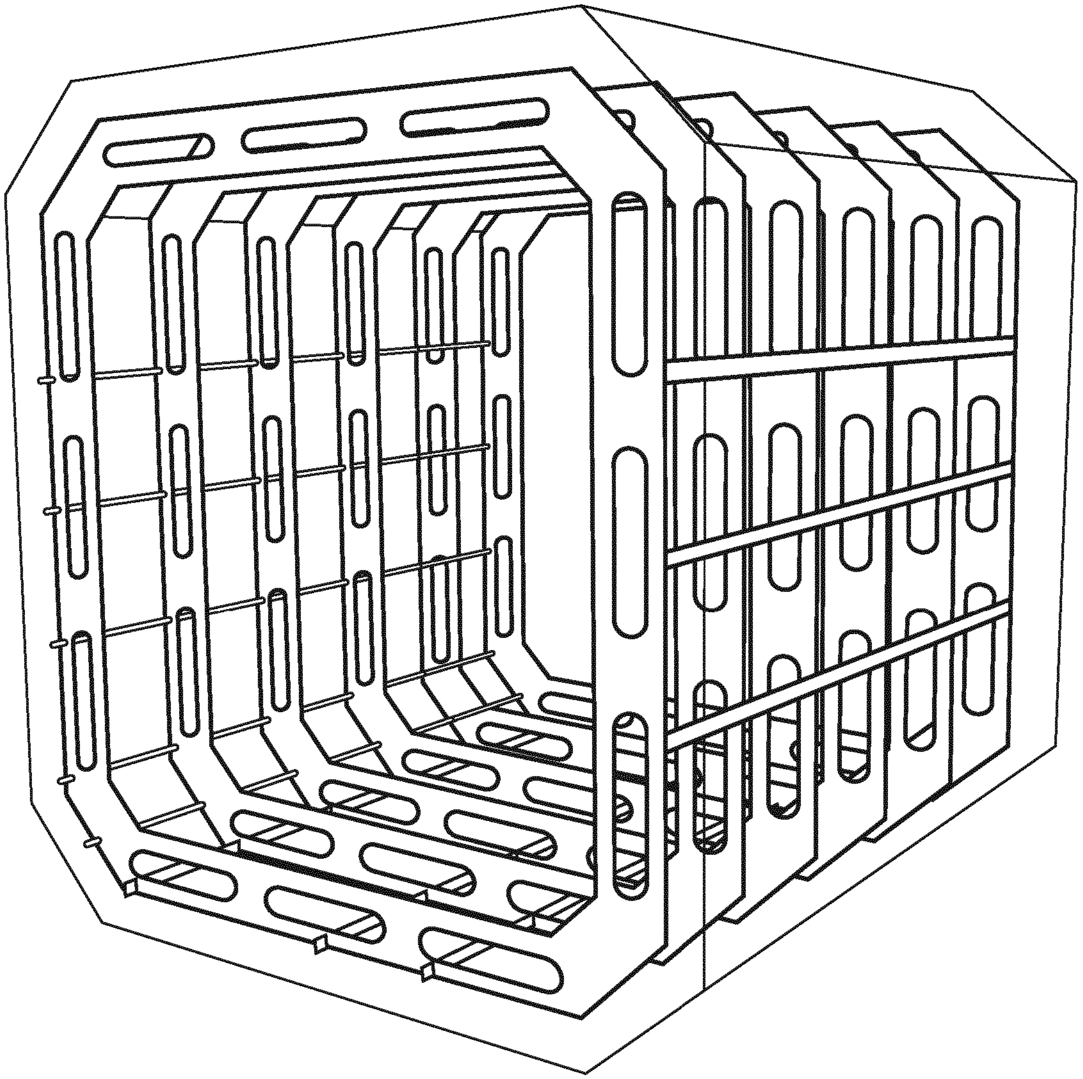
FIG. 8 shows the reinforcement arrangement from FIGS. 7A and 7B with the tank surface.

FIG. 8 shows the tank surface surrounding the structure shown in FIGS. 7A and 7B.

As described above the novel prismatic tank arrangement described herein may be conveniently arranged to correspond to the dimensions set out in freight transport regulations such as, for example, ISO regulations for containers.

Figure 9:
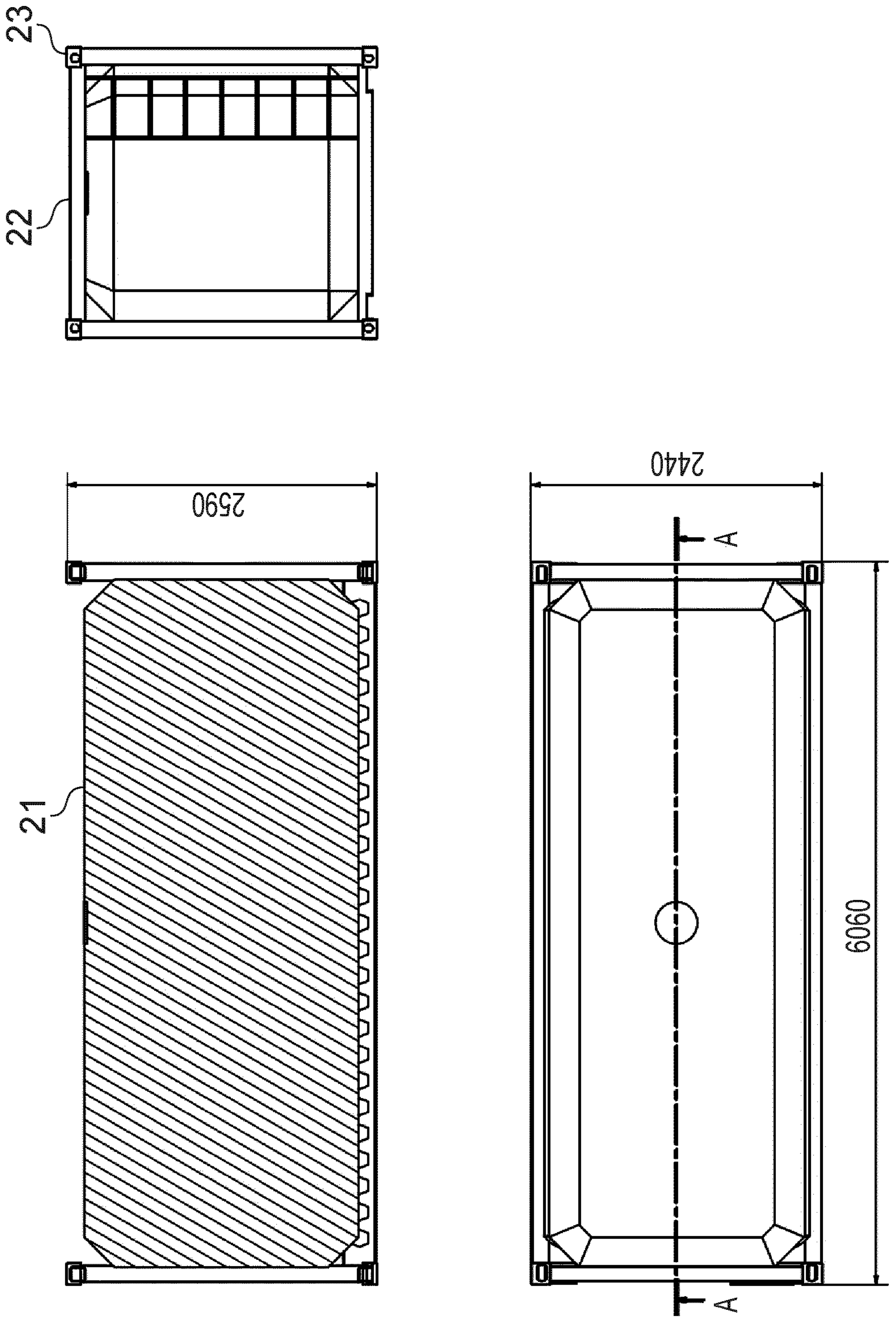
FIG. 9 shows an ISO container frame containing the prismatic tank arrangement described herein.

FIG. 9 illustrates one such example which incorporates a prismatic extruded tank described herein within an ISO container envelope. The tank 21 may be positioned within the container outer frame 22. As illustrated the outer frame 22 provides the standard attachments 23 which allow such containers to be connected to each other and/or secured to a base such as a ship's deck and coupled together for mass transportation on ships for example and as illustrated in FIG. 1.

Figure 10:
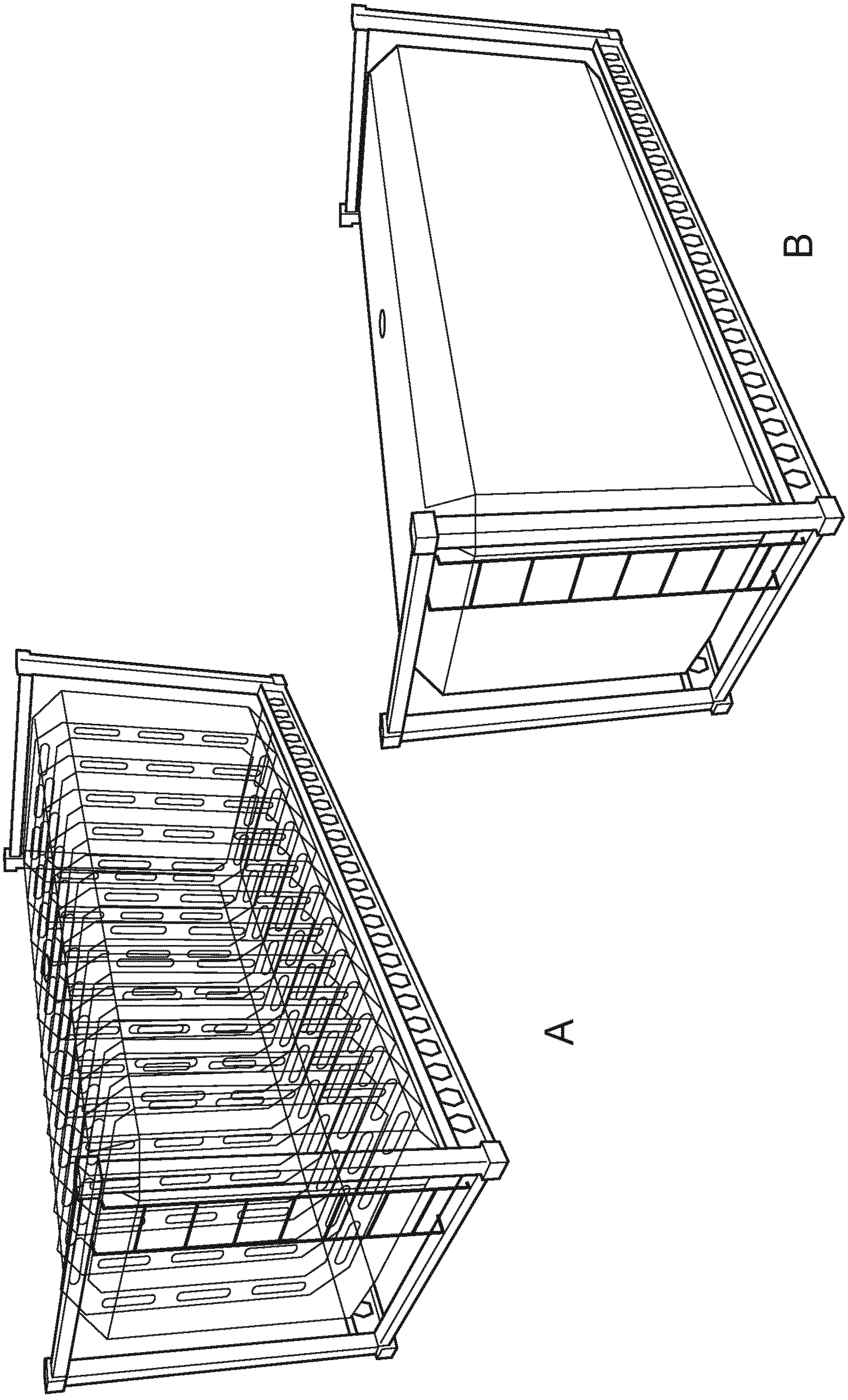
FIGS. 10A and 10B show an ISO container and prismatic tank and also internal reinforcements.

FIGS. 10A and 10B show such an ISO arrangement and a prismatic extruded tank. FIG. 10A also illustrates the optional internal ribs extending, in this example, along the length of the tank.

The insulation of the prismatic tank and the combination of insulation and tanks will now be described. It will once again be recognised from the teaching herein that the tank and insulation combination may be used for both cargo and fuel tank applications.

Figure 11A:
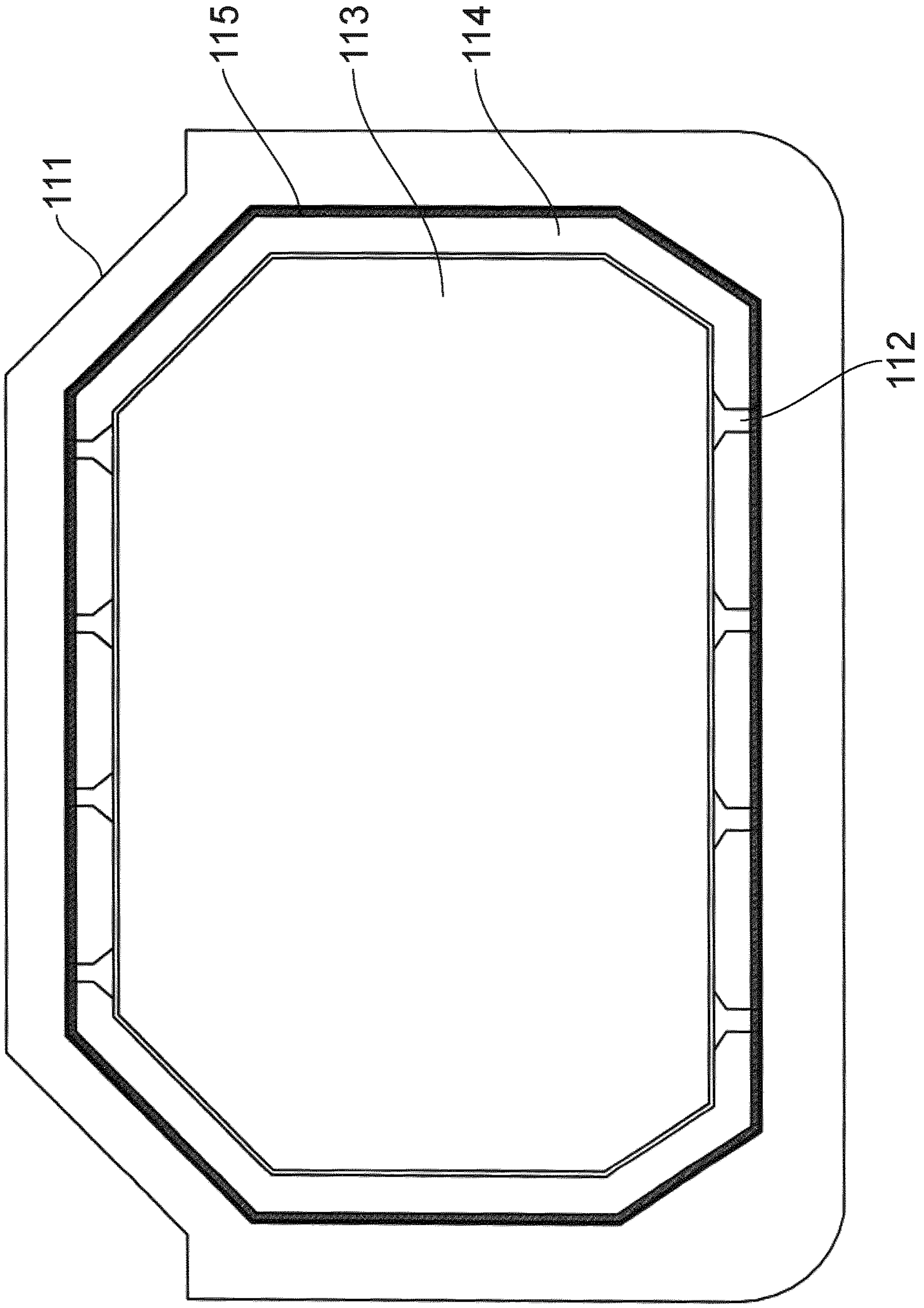
FIGS. 11A and 11B show a cross-section through a conventional liquefied gas carrying ship.

FIG. 11A shows a cross-section through a conventional gas carrying ship 111, adapted for the transfer of a liquefied gas cargo. Gas is liquefied and pumped into tanks within the ship for long distance transport. In order to maintain the gas in a liquefied state the tanks of the ship must be maintained at a very low temperature which requires specific insulation of the cargo tanks.

The ship comprises a cargo support system 112 which provides support for the cargo tank 113 against and within the hull of the ship. The tank 113 acts as the primary containment barrier of the ship and is typically formed of steel or aluminium designated for low temperature applications.

An inter-barrier space 114 is provided which defines a space between the tank 113 and a further secondary barrier. This may be the inner hull of the ship and may be another layer of insulation material or an insulation arrangement of the ship. In such a case, the inter-barrier space provides an accessible space between the outer surface of the tank 113 and insulation that is arranged on the surface of the inner hull.

Alternatively, the insulation arrangement may be constructed adjacent to or attached to the tank and perform as a barrier itself. In such case, the inter-barrier space will be defined by the distance from the outer surface of the tank 113 and the insulation arrangement also performing as a barrier.

The tank 113 is arranged to contain the cargo of the ship which may be a variety of liquefied gases. In one example the cargo may be liquefied natural gas (LNG) maintained at a temperature of −163 degrees C. Another example may be liquefied hydrogen maintained at a temperature of −253 degrees C.

To comply with legal requirements for the transportation of liquefied gas, a secondary protection layer 115 is provided. This may be arranged on the surface of the inner hull or by alternative means. In the event that the primary tank 113 should fail or leak, the liquefied gas can flow into a space, e.g. the inter-barrier space 114 and be contained by the secondary protection layer 115. This layer prevents the liquefied gas from contacting the hull which could cause fatal failure of the hull owing to the extremely low temperature of the liquefied gas.

The arrangement shown in FIG. 11A is a commonplace structure of ships that are used to transport liquefied gases such as LNG. These gas carrying ships provide a secure primary tank to contain the cold liquid and a secondary back-up layer system should the primary tank leak or fail.

A disadvantage of this construction of LNG carrying ships is the time it takes for construction and consequently costs, and challenges associated with the logistics of the construction process. As described herein the construction of such vessels can be slow because the tank cannot be installed until the structure of the vessel and the secondary barrier have first been installed on the hull surface. In a case where the insulation is constructed adjacent to or attached to the tank and performing also as a secondary barrier, the tank may be installed directly following the construction of the vessel's hull.

An advantage of the present invention is the way in which components of the ship can be installed in parallel thus reducing the overall construction time of a liquefied gas carrying vessel.

Figure 11B:
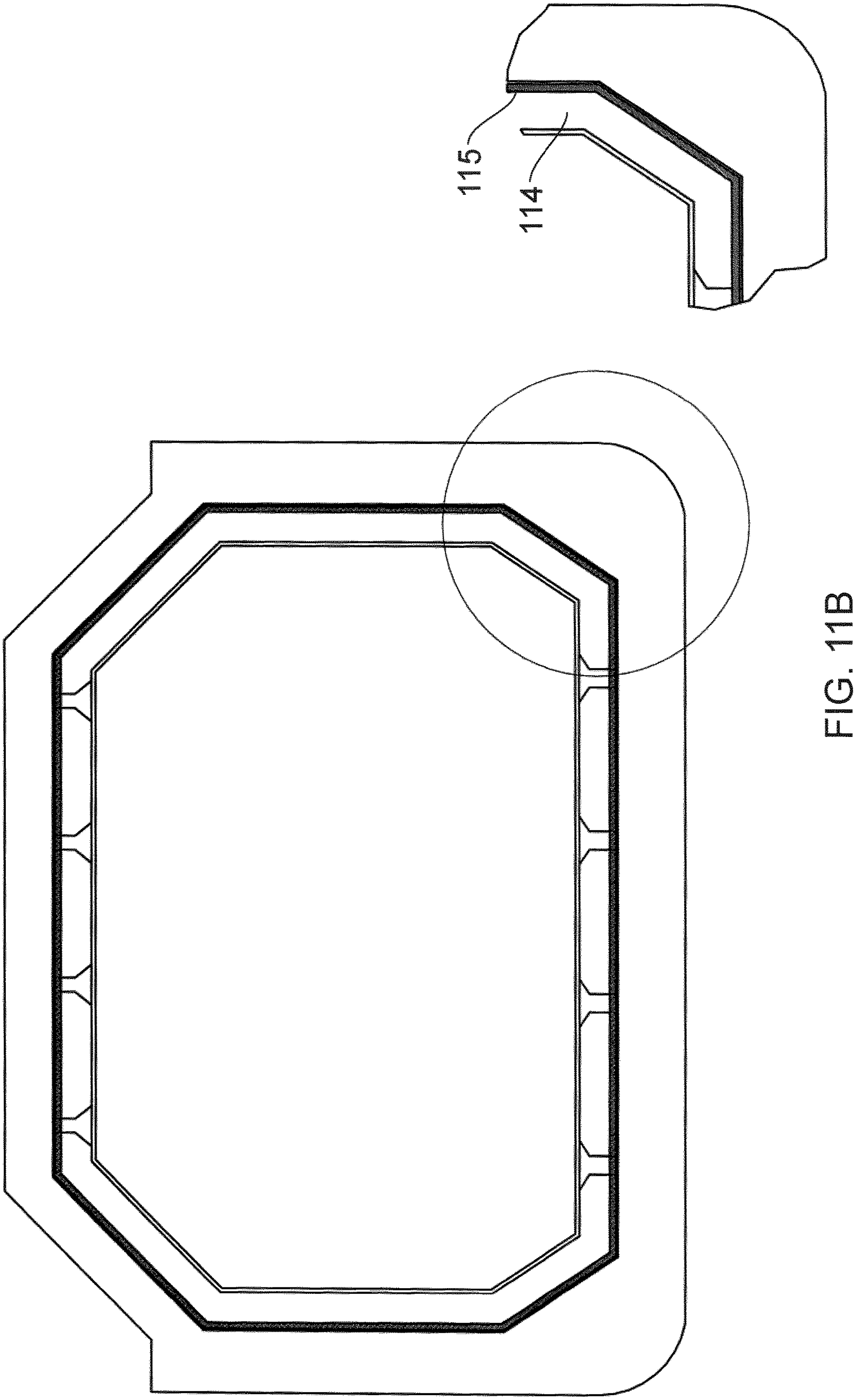

FIG. 11B shows a closer view of the corner of a conventional arrangement as shown in FIG. 11A. Here the inter-barrier space 114 and secondary insulation layer 115 are more clearly visible.

Figure 12A:
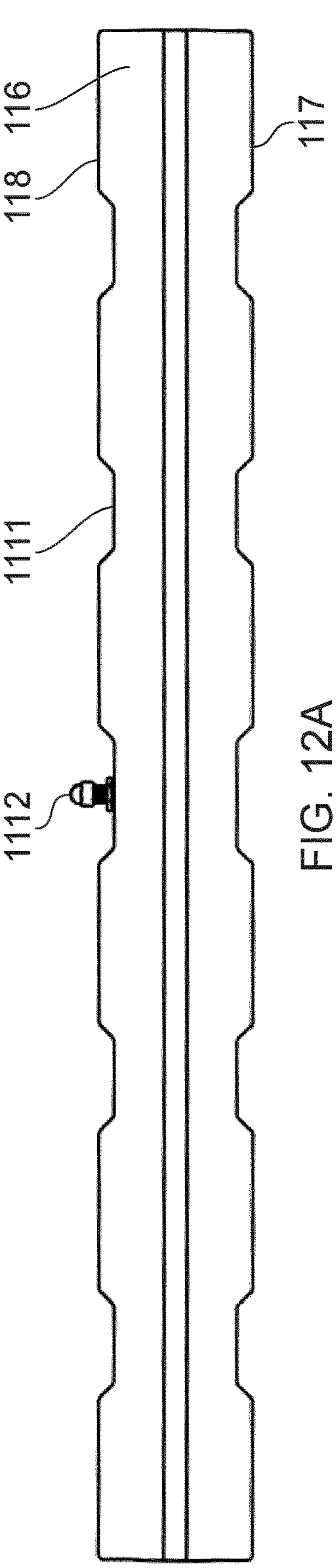
FIGS. 12A and 12B show an insulation arrangement as described herein.
Figure 12B:
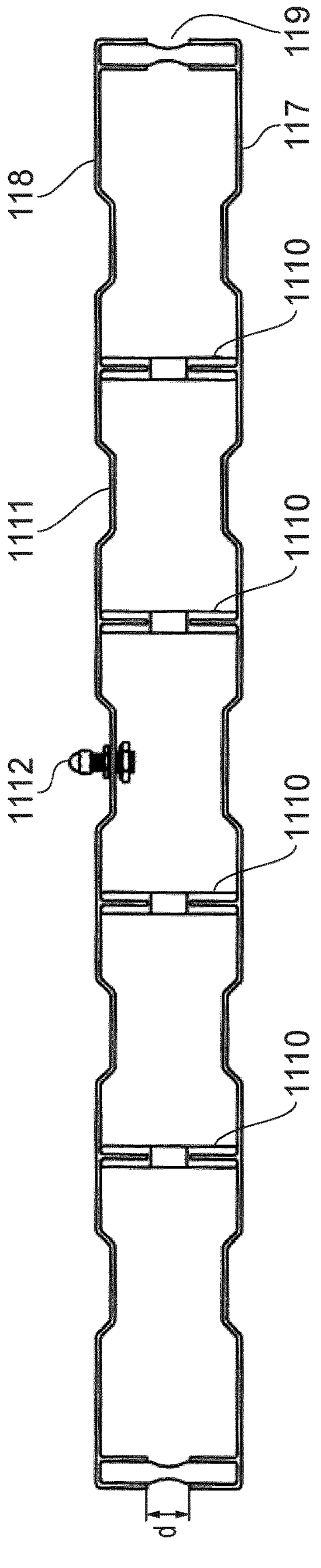

FIGS. 12A and 12B show a side view and cross-section (respectively) through one embodiment of an insulation arrangement described herein.

FIG. 12A show the general arrangement of the insulation arrangement. The arrangement 116 comprises a first inwardly facing layer 117 and a second outwardly facing layer 118. The inwardly facing layer is arranged in use to face or abut with the tank containing the liquefied gas (for example the primary containment tank 113 shown in FIG.

11A) i.e. the term 'inwardly' refers to the side of the arrangement that, in use, faces inwards towards the cold cargo.

The opposing surface 118 is arranged in use to face outwards towards the inter-barrier space 114 or the hull of the vessel (see FIGS. 11A and 11B) i.e. outwardly from the cold cargo.

FIG. 12B shows the arrangement in cross-section. As shown the first layer 117 and second layer 118 are spaced apart by distance d defining the cavity or space 119. Discrete elements 1110 are located between the two layers or surfaces 117, 118 and maintain the space between the two layers.

FIGS. 12A and 12B also illustrate the corrugations 1111 that are formed in one or both surfaces and which increases the structural strength by increasing the rigidity of the layers and additionally and advantageously accommodates thermal expansion and contraction of the surfaces of the panel.

FIGS. 12A and 12B also show a vacuum valve 1112 which allows for air communication between the space within the arrangement and the outside ambient conditions. The valve 1112 is arranged to receive an air pump (vacuum pump) that is operable to reduce the pressure within the space between the layers to, or close to, a vacuum. This is discussed further below.

Figure 13:
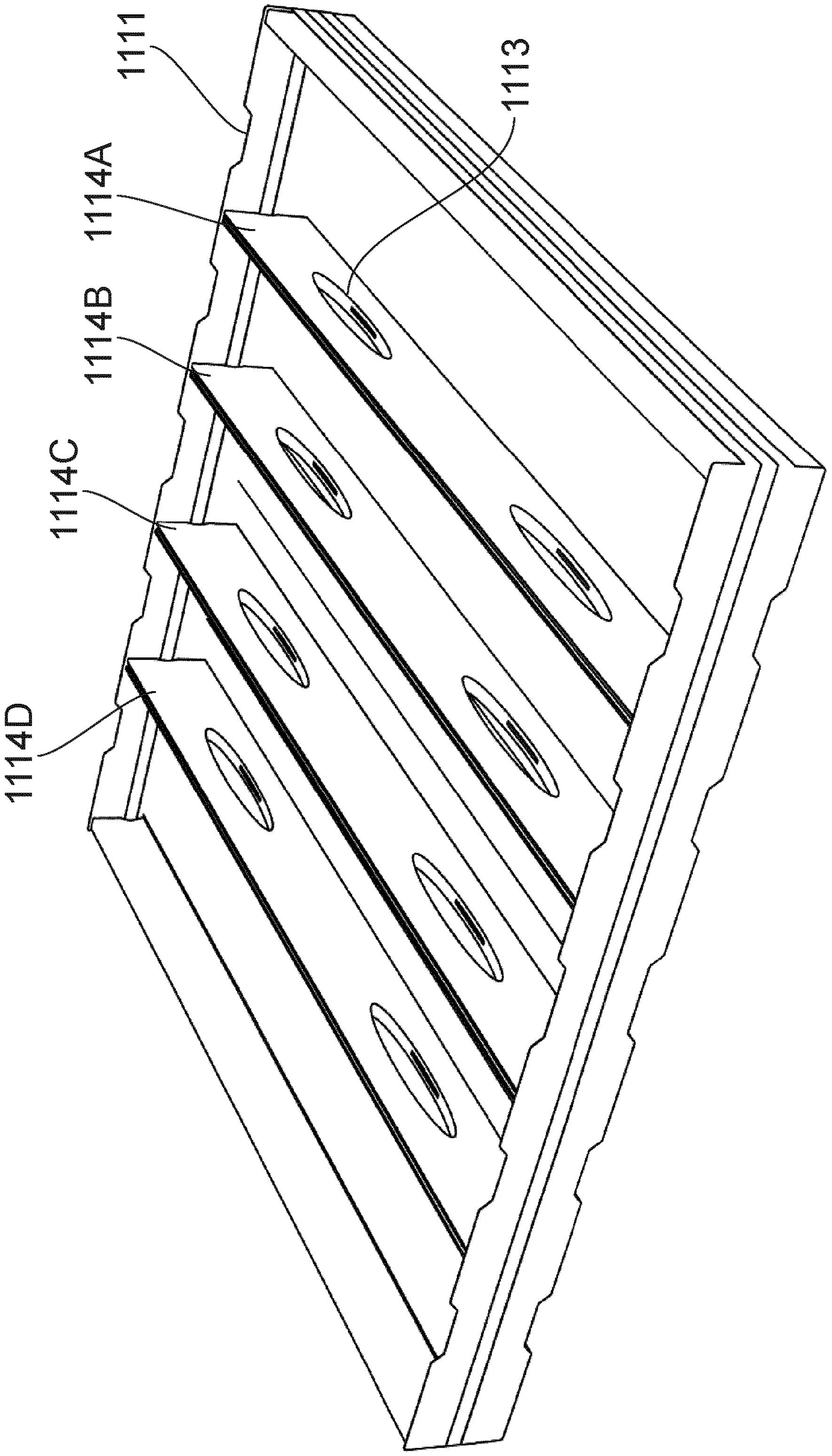
FIG. 13 shows a view of a single panel with one outer surface removed to reveal the inner components.
Figure 14A:
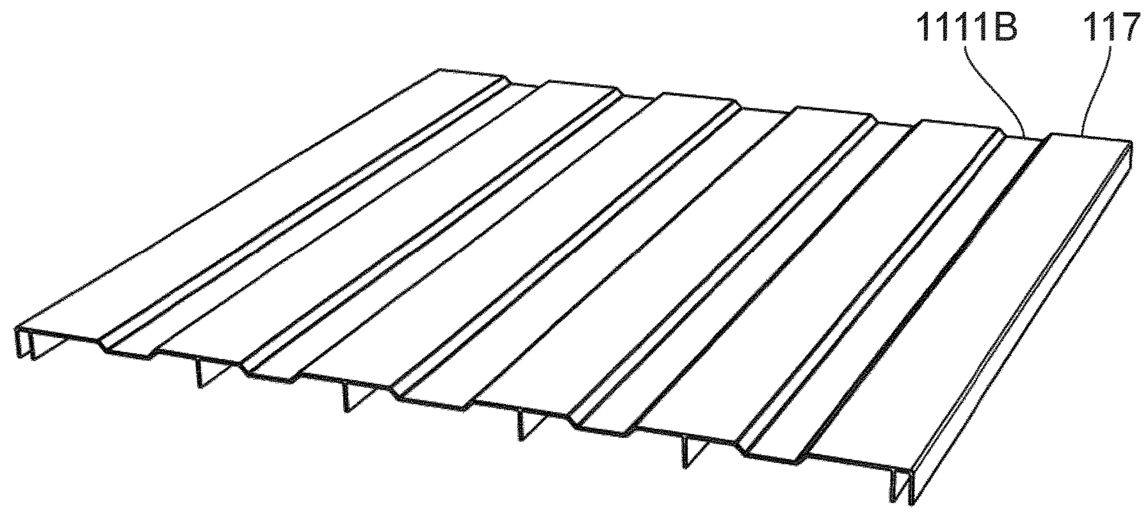
FIG. 14A shows an upper surface of the panel for connection to the arrangement shown in FIG. 13.

FIG. 13 shows another view of a unit shown in FIGS. 12A and 12B. Here the internal arrangement of the unit or panel is shown. As shown a series of corrugations 1111 are arranged across and along the length of the panel. With reference to FIG. 14A a corresponding profile 11118 is shown which fits within the corrugation profile 1111 when the two parts are brought together. Hence the corrugations can increase the rigidity of the panel.

Returning to FIG. 13, in one embodiment the discrete elements spacing the surfaces 117, 118 are in the form of a plurality of elongate members 1114A, 1114B, 1114C and 1114D. It will be recognised that any number of elements may be used. The discrete elements extend from one end of the panel to the other providing support for the two surfaces along their entire length.

In order to allow for the movement of air within the panel and between the two opposing layers, each discrete spacing element (1114A-1114D) is provided with a plurality of apertures 1113 which allow air to move freely within the panel. Thus, as air is drawn through the valve 1112 the entire space within the panel can be evacuated of air and a vacuum can be created.

Advantageously by creating a vacuum in the panel as opposed to using an insulating material, such as a foam or the like, the insulating properties of the panel can be significantly improved. Additionally, the weight of the panel can also be significantly decreased since the space between the layers of the panel is both void of material and is evacuated of air.

The two faces or layers 117, 118 are then structurally supported from each other by a plurality of discrete support elements, one example being shown in FIG. 13. Layers and supporting elements may be manufactured in aluminium by extrusion as one example. Thus, the panel is able to support or resist the force caused by the atmospheric pressure which acts on the two surfaces 117, 118 and the perimeter 1115 (see FIG. 17) when air is drawn from the panel and vacuum is established. The panel is furthermore able to support any external load applied to the panel which may be caused, for example, by a leak or rupture of the tank causing the weight of the liquid to act on the panel.

Figure 14B:
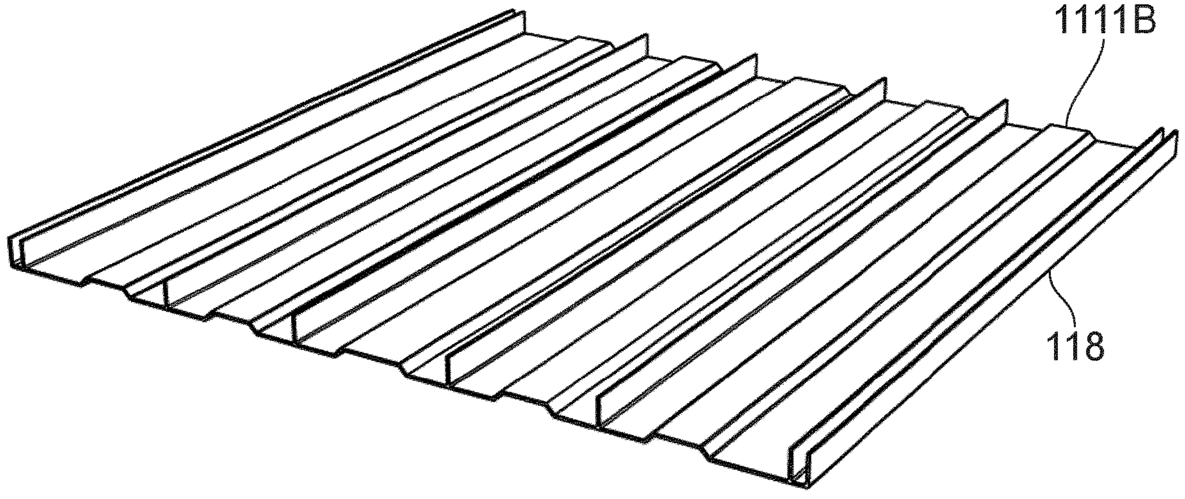
FIG. 14B shows an opposing (lower) surface of the panel.

FIGS. 14A and 14B show one example of the construction of the panel using extruded layers 117, 118 to form the two opposing layers of the panel. Extruding each layer from, in one embodiment, aluminium advantageously allows the layers to be formed of any convenient length and width. It allows a cost effective and simple way to form each layer and, furthermore, allows the corrugations 1111 to be quickly and easily formed.

The perimeter of each panel will now be described with reference to FIGS. 15A and 15B.

Figure 15A:
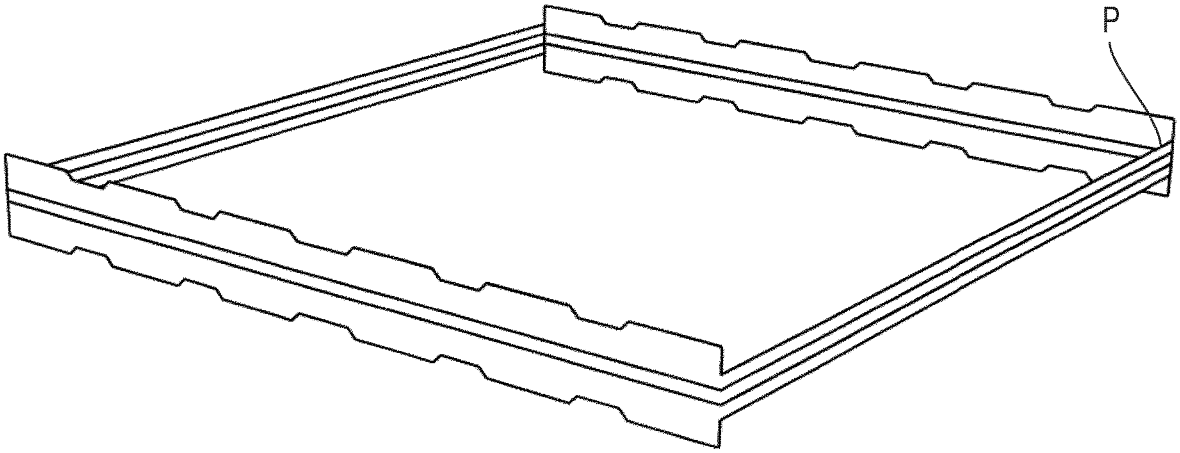
FIGS. 15A and 15B show a perimeter section of the panel.

As shown in FIG. 15A the perimeter P extends around the sides of the panel and provides an impermeable seal once connected to the edges of each of the two opposing layers shown in FIGS. 14A and 14B. The end portions have profiles that are complementary to the corrugations 1111. The panel is formed by welding the perimeter P to the two layers thereby creating a sealed internal space bound by the perimeter around the edges and the two opposing faces.

As one example perimeter of each panel will now be described with reference to FIGS. 15A and 15B. The perimeter forms the side boundaries of the panel. Once the inwardly facing surface and outwardly facing surfaces are coupled to the perimeter (for example by means of welding) a sealed volume is thereby formed. Air can be evacuated from the volume and a vacuum is generated inside the arrangement.

Figure 15B:
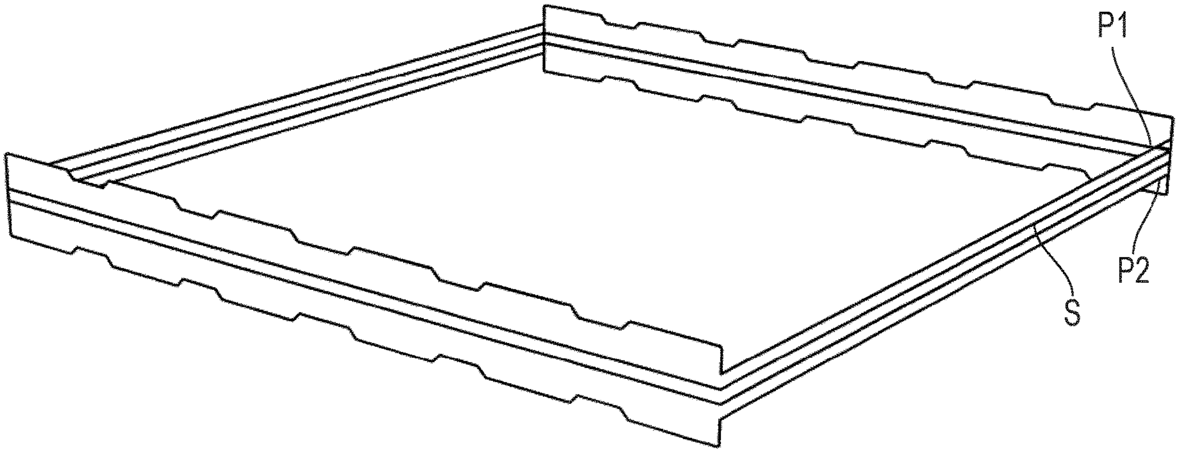

FIG. 15B illustrates the perimeter as adjacent but unconnected components P1 and P2 with a space S between the two perimeter components. The space can be bridged (as described below) with a dissimilar material that has lower heat transfer properties than the material used for P1 and/or P2. Thus, a thermal isolator can be formed.

The perimeter may advantageously be a metal which may be conveniently welded to the two layers to provide the impervious surface around the perimeter of the panel.

Because the inwardly facing panel will be proximate the cold primary tank, the temperature of the inwardly facing surface will be substantially lower than the temperature of the outwardly facing layer which may, for example, be at ambient temperature or at approximately seawater temperature.

In one embodiment of an apparatus for containing liquefied hydrogen, the inwardly facing surface may be at a temperature $<-250$ degrees C. whilst the outwardly facing surface may be at a temperature of $>0$ degrees C. Thus, there is a significant temperature differential or gradient across the panel.

Any suitable material may be used to form the layers of the panel and the discreet support elements. For example, aluminium may be used which has low density and can be used with corrugations to create a strong structure. However, the thermal conductivity of aluminium is approximately 121 W/mK and this disadvantageously allows the ambient temperature to be conducted through the material and to the cold side of the panel (and to the liquefied gas containing tank).

A thermal isolator may therefore be used to prevent heat transfer between the two surfaces. This is illustrated, in one example, in FIG. 16.

Figure 16:
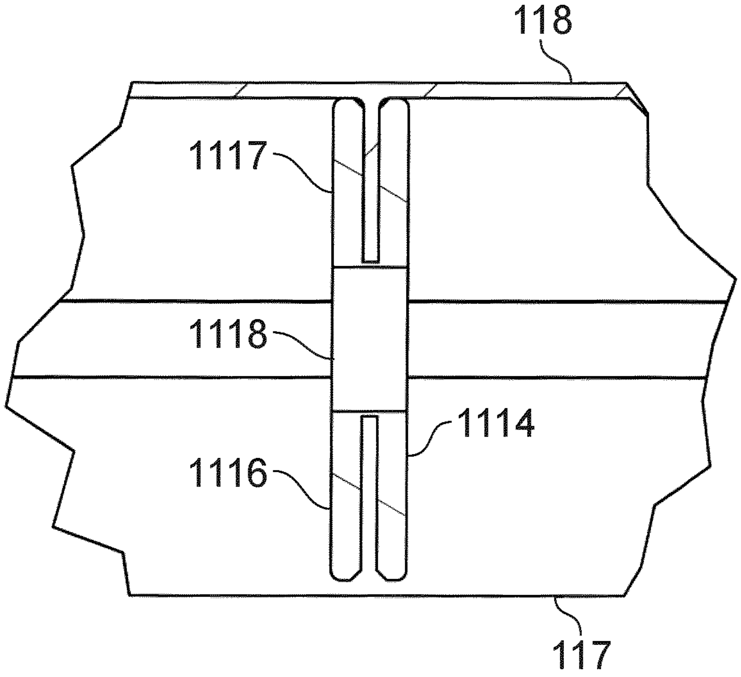
FIG. 16 shows a cross-section through a thermal isolator.

FIG. 16 shows the first and second layers 117, 118 and a single discrete support element 1114 extending therebetween. The support element 1114 is formed of a first portion 1116 extending from the first layer and a second portion 1117 extending from the second layer. The two portions may be coupled together through a thermal break or isolator 1118.

The thermal isolator 1118 may be a dissimilar material to the two portions 1116, 1117. For example, the layers 117, 118 and portions 1116, 1117 may be formed of aluminium. In one example the portions 1116, 1117 may be formed so as to be integral with the layers 117, 118 for example by means of extrusion. Alternatively, they may be welded at the intersection of the portions with a respective layer.

In the example shown in FIG. 16 the thermal isolator 1118 may be a portion of stainless-steel which has a much lower thermal conductivity than the adjacent aluminium (for example approximately 12 W/mK as opposed to 121 W/mK). Thus, heat is restricted from passing directly along the discrete element and instead is prevented from passing through the thermal isolator.

In an arrangement where stainless-steel is used for the isolator 1118 and aluminium is used for the two portions 1117, 1116, the connection may be by means of known welding techniques for connecting stainless steel to aluminium. Other suitable bonding-processes may be applied.

The thermal isolator 1118 may alternatively be of a polymer such as rubber, POM, PTFE or PEEK suitable for cryogenic applications. Connection may be made by adhesive bonding or vulcanisation bonding.

The thermal isolator 1118 may also be required around the perimeter of the panel as illustrated in FIGS. 15A and 15B. A similar arrangement may be used as shown in FIG. 16. Importantly the perimeter also experiences a lateral force owing to the atmospheric pressure acting on the perimeter as the internal air within the panel is evacuated. The thermal isolator is therefore required to resist sideways or lateral movement.

Figure 17:
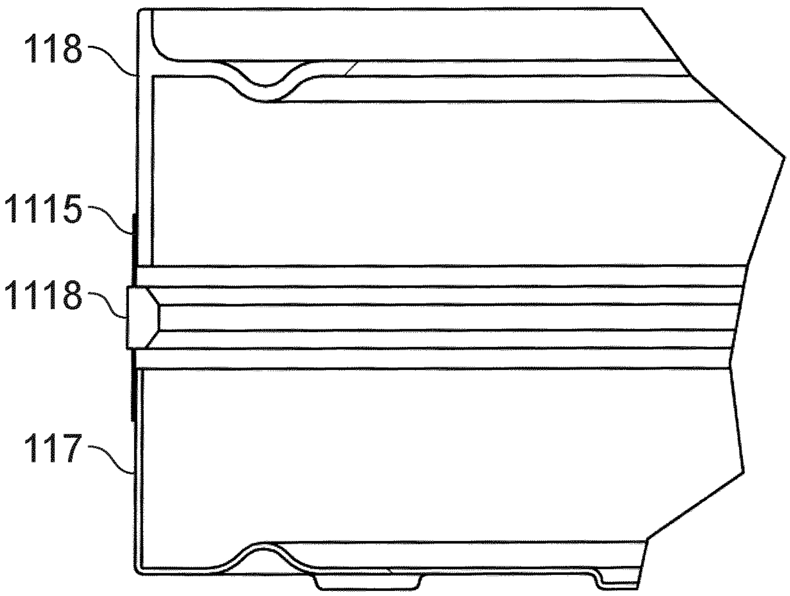
FIG. 17 shows a cross-section through a perimeter section of a panel.

FIG. 17 illustrates one example of how the perimeter 1115 may be adapted to incorporate the thermal isolator. Here the isolator 1118 is triangular in cross-section meaning that the atmospheric pressure acts to bias the isolator into the gap between the first and second portions of the perimeter section 1115. The isolator 1118 may alternatively be a welded plate or of other geometry.

The thermal isolator 1118 may be located at any distance from the upper or lower layers 117, 118.

In yet another example the discrete support elements may be formed of a wood such as plywood, bamboo, cardboard or other material preferably with low thermal transfer properties.

FIG. 17 also illustrates the perimeter of the layers which may be used to conveniently allow two adjacent panels to be welded together. In such an arrangement a single internal volume or space may be created by sealing, through an impermeable welded joint, one or more adjacent panels together. The weld could, for example, be applied to the upper and lower edges of the panel when two adjacent panels abut one another.

As described above, the individual panels may be rectangular or square in shape allowing adjacent shaped to be conveniently tessellated and joined together (for example by welding). Other shapes may also be used including triangles. A combination of different shapes may be used according to the geometry of the tank or room/hold-space which is to be insulated.

Figure 18C:
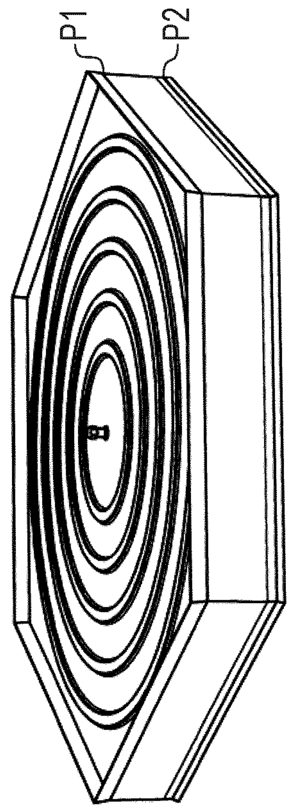
FIGS. 18A to 18D show a hexagonal panel arrangement.
Figure 18D:
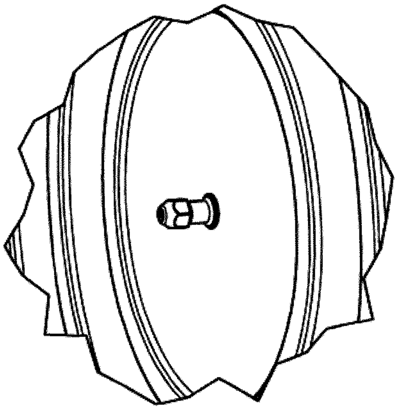
Figure 18A:
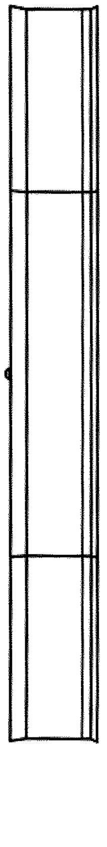
Figure 18B:
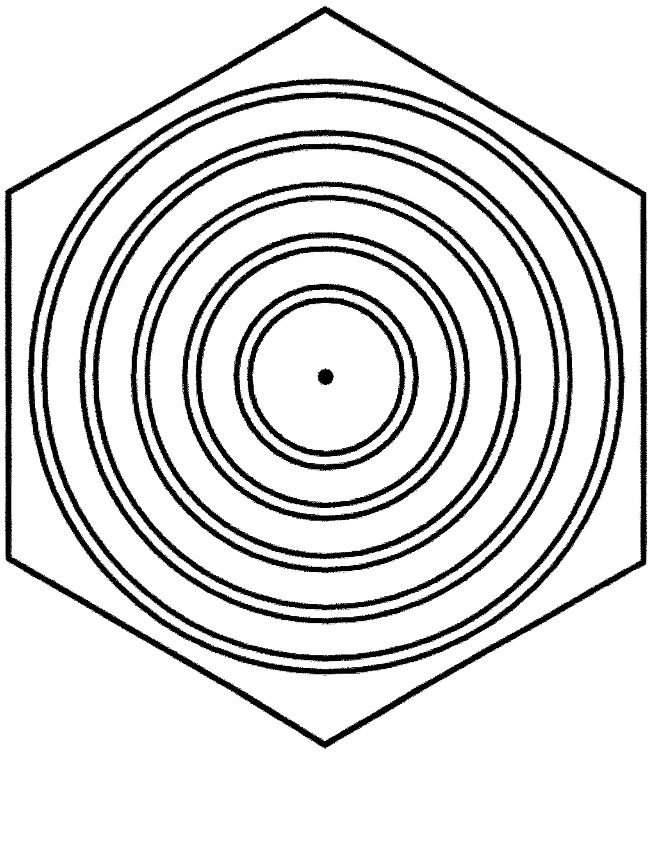

FIGS. 18A to 18C illustrate an alternative tessellating panel in the form of a hexagonal shape. Advantageously the hexagon can tessellate, and thermal expansion is uniform when measured radially outwards from the centre of the hexagon. FIG. 18D illustrates the evacuation valve allowing air to be drawn out to create a vacuum inside the hexagonal panel.

The interior of the hexagonal panel will now be described with reference to FIG. 19.

The hexagonal panel may comprise a plurality of discrete support elements arranged in a range of different distributions and configurations. In the example shown in FIG. 19, instead of elongate strips of material extending along the panel or concentric rings radially spaced across the panel, the support elements are in the form of a plurality of columns.

Figure 19A:
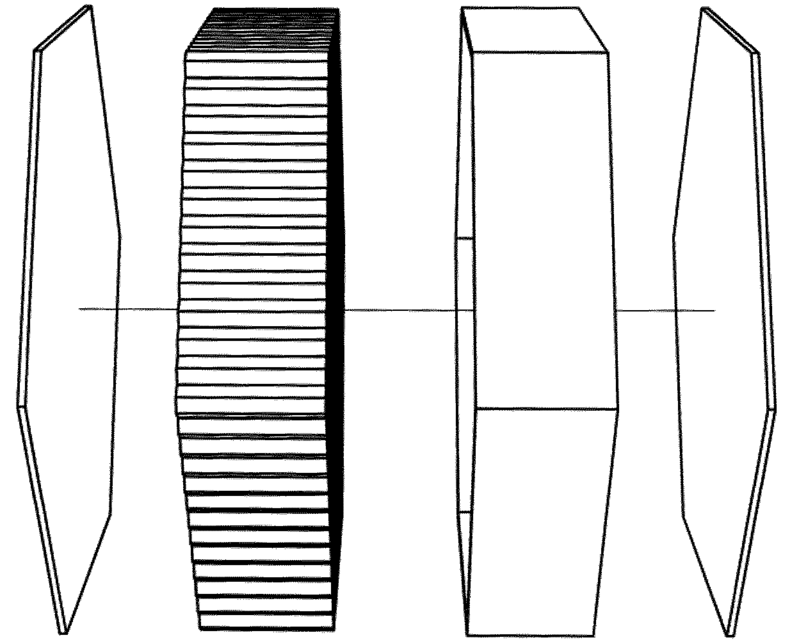
FIG. 19A shows an exploded view of the components forming the hexagonal panel.
Figure 19:
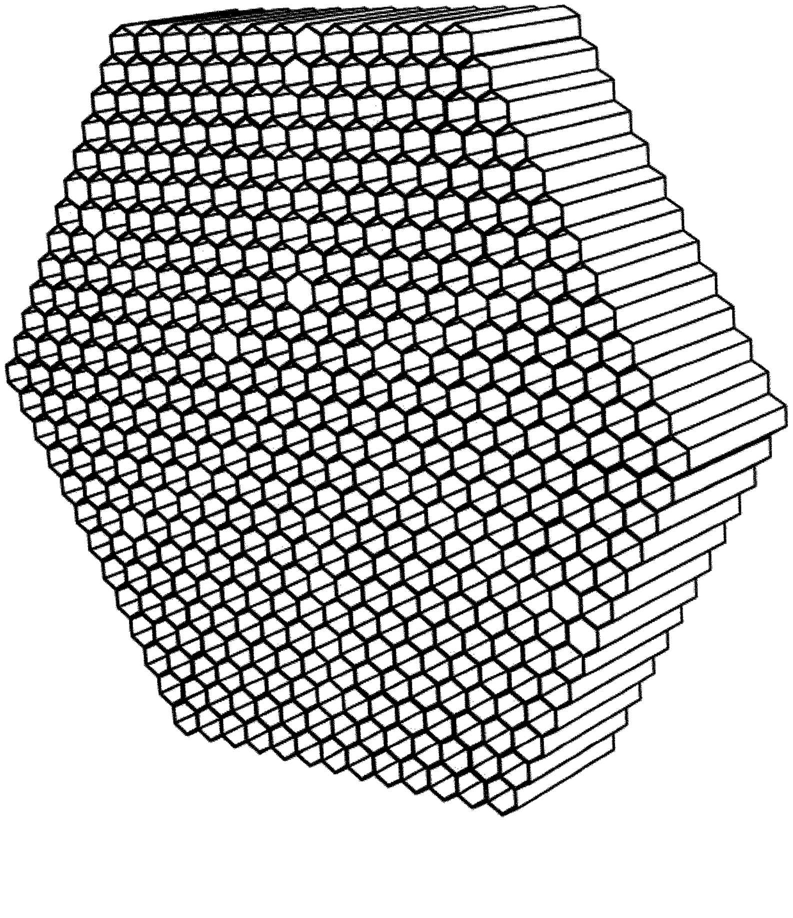
FIG. 19 shows a plurality of internal spacing elements inside a hexagonal panel.

The columns may, for example, be cylindrical or hexagonal columns extending from the inwardly and outwardly facing surfaces as shown in FIG. 19. The columns may rest directly on the inwards and/or outwards panel or on a material-support layer applied on the inside of the respective layers. This material-support layer may, advantageously, have low thermal transfer characteristics. The columns can then provide the support needed to maintain the separation of the two surfaces or layers as the vacuum is drawn in the panel. Low thermal conductivity means that heat transfer across the panel is minimised.

As shown in FIG. 19, the columns may also be in the form of hexagonal shapes which advantageously allows the individual columns to tessellate within the body of the hexagonal panel and to extend across the area of the panel. Thus, vertical and lateral loads can be accommodated.

Each column may be configured as described with reference to FIG. 16 with an intermediate thermal isolator. However, advantageously a single continuous material such as wood (for example plywood or wood composites), bamboo, cardboard or stainless-steel can also be used having low thermal conductivity. Thus, a thermal isolator may be used which increases simplicity and reduces manufacturing costs.

FIG. 19A illustrates the sub-components which make up the hexagonal panel. As illustrated a hexagonal array of individual hexagonal columns is located between in upper and lower surfaces and within the outer perimeter of the panel.

In an alternative optional arrangement, the columns may themselves also be filled with an insulating material, such as an expanded foam, perlite or the like. The columns may each be all or partially filled with such material which may advantageously increase the strength of the panel and/or the thermal characteristics. All or a sub-set of the columns may be filled such that a balance can be achieved between strength, weight and thermal performance.

Figure 110:
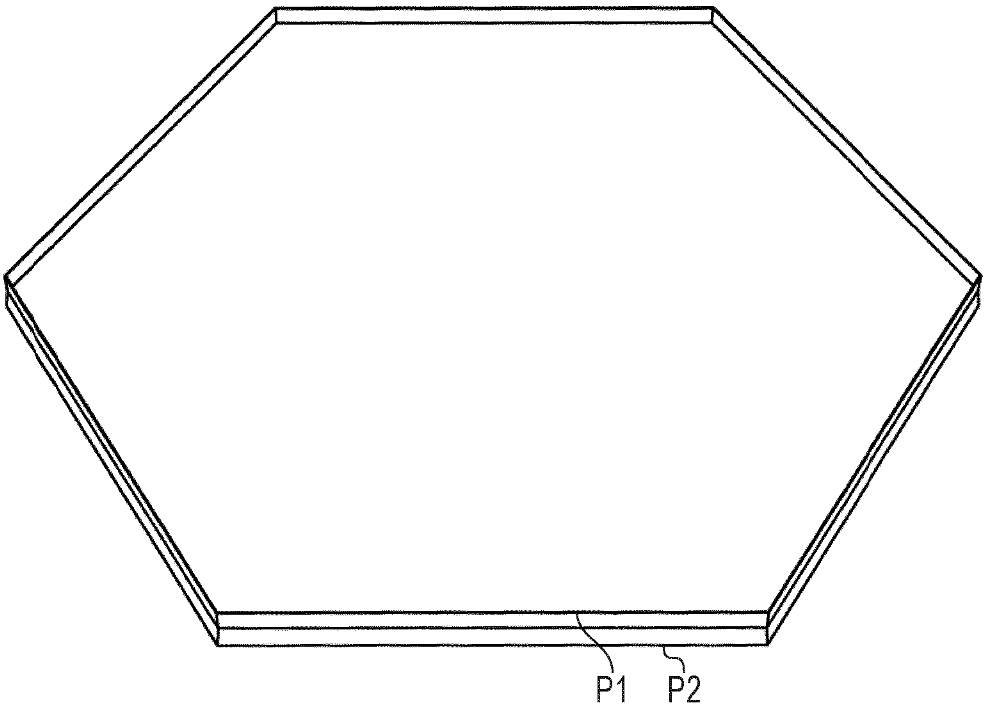
FIG. 110 shows the outer surfaces of the hexagonal panel arrangement.
Figure 111:
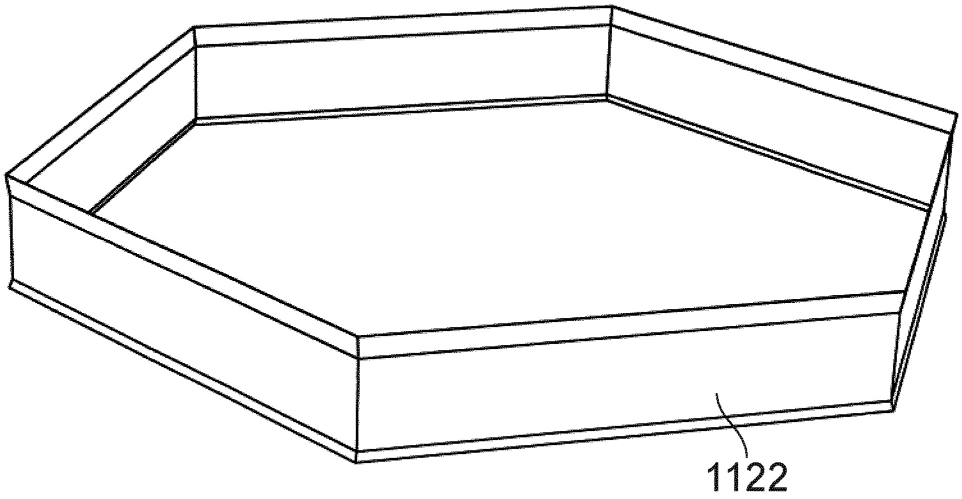
FIG. 111 shows a hexagonal perimeter which, when coupled to the surfaces shown in FIG. 110 defines the volume of the panel which can be evacuated.

FIGS. 19 and 110 show the hexagonal panel internal details. FIG. 110 also illustrates the two perimeter portions P1 and P2 corresponding to the perimeters described above with reference to FIG. 15B. FIG. 111 illustrates the perimeter 1122 of the hexagonal panel.

Each of the columns shown in FIG. 19 may additionally be provided with a hole, slot or aperture allowing air communication into and out of each column. Thus, air can be drawn from each column through the valve shown in FIG. 18D to create a vacuum across the panel and inside of each column. Pressure differentials within the panel can be avoided and the thermal properties of the vacuum maintained.

It remains a requirement of the hexagonal panel that the entire perimeter is air-tight (impervious to gas flow) whilst maintaining the thermal insulation properties needed between the inwardly facing surface and outwardly facing surface. This can be achieved with reference to FIG. 112A.

Figure 112A:
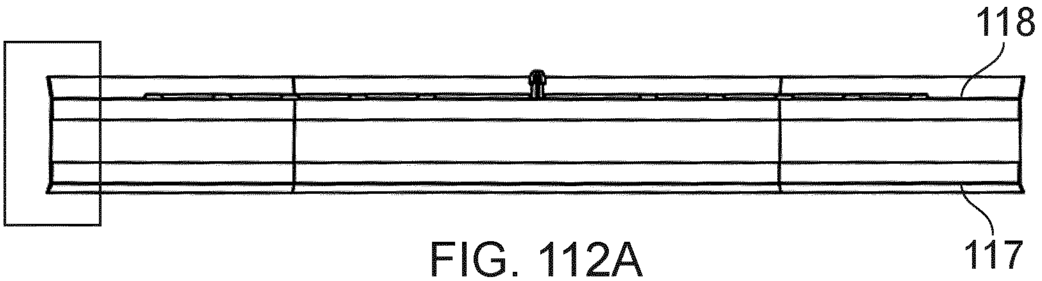
FIG. 112A shows a perimeter of a panel and rim arrangement.

FIG. 112A illustrates one embodiment of a hexagonal panel arrangement.

The panel comprises the inwardly facing surface 117 and outwardly facing surface 118 and additionally (see FIG. 112B) two lips or rims $R_i$ and $R_o$.

Figure 112B:
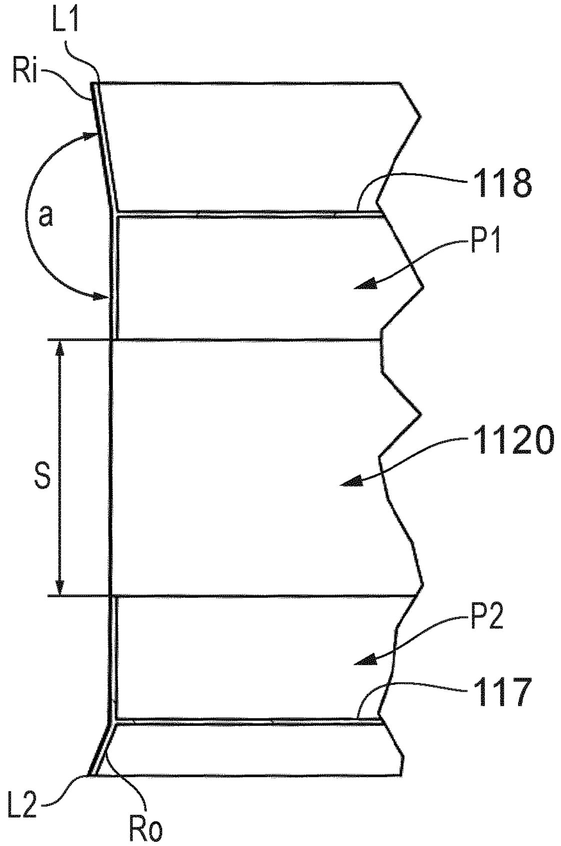
FIG. 112C shows the abutment of adjacent panels.

The rims or lips are additionally illustrated in FIG. 112B where it can be seen that a rim extends from the outwardly facing surface and around the perimeter of the panel. The function of the rim is described below.

The rim is angled with respect to the vertical side surface of the perimeter of the panel as shown by angle a (which is greater than 90 degrees). The panel is constructed of an outwardly facing component P1 and an inwardly facing component P2 as also illustrated in FIGS. 18C and 110. A separation S is provided between the two components forming the opposing surfaces of the hexagonal panel.

To create the seal around the perimeter of the panel a thin layer of stainless-steel 1120 is coupled to the outer perimeter of the panel to overlap the separation S and to be coupled to the two components P1 and P2.

The stainless-steel layer may advantageously be bonded to an inner liner of wood or similar material within the perimeter of the panel and itself extending across the separation S. Providing a backing layer allows the stainless-steel layer to be extremely thin and thereby simultaneously provide:

(a) the required air sealing surface around the perimeter of the panel; and (b) the thermal isolation that is required around the perimeter of each panel.

The stainless-steel may extend across the entire depth of the panel i.e. from L1 to L2 in FIG. 112B.

FIG. 112B shows a thin stainless-steel layer and the backing surface as described above. The thicknesses of the materials forming the arrangement shown in FIG. 112A may be selected according to the desired thermal and structural performance of the panel. For example, the dimensions may be within the following ranges:

Outwardly facing layer thickness range –0.2 mm to 1 mm
Inwardly facing layer thickness range –0.2 mm to 1 mm
Range of separation S—up to 200 mm
Thickness of thermal isolation layer—a thickness less than the thickness of the adjacent material, for example 0.8 mm with an adjacent material thickness of 1 mm.

Figure 112C:
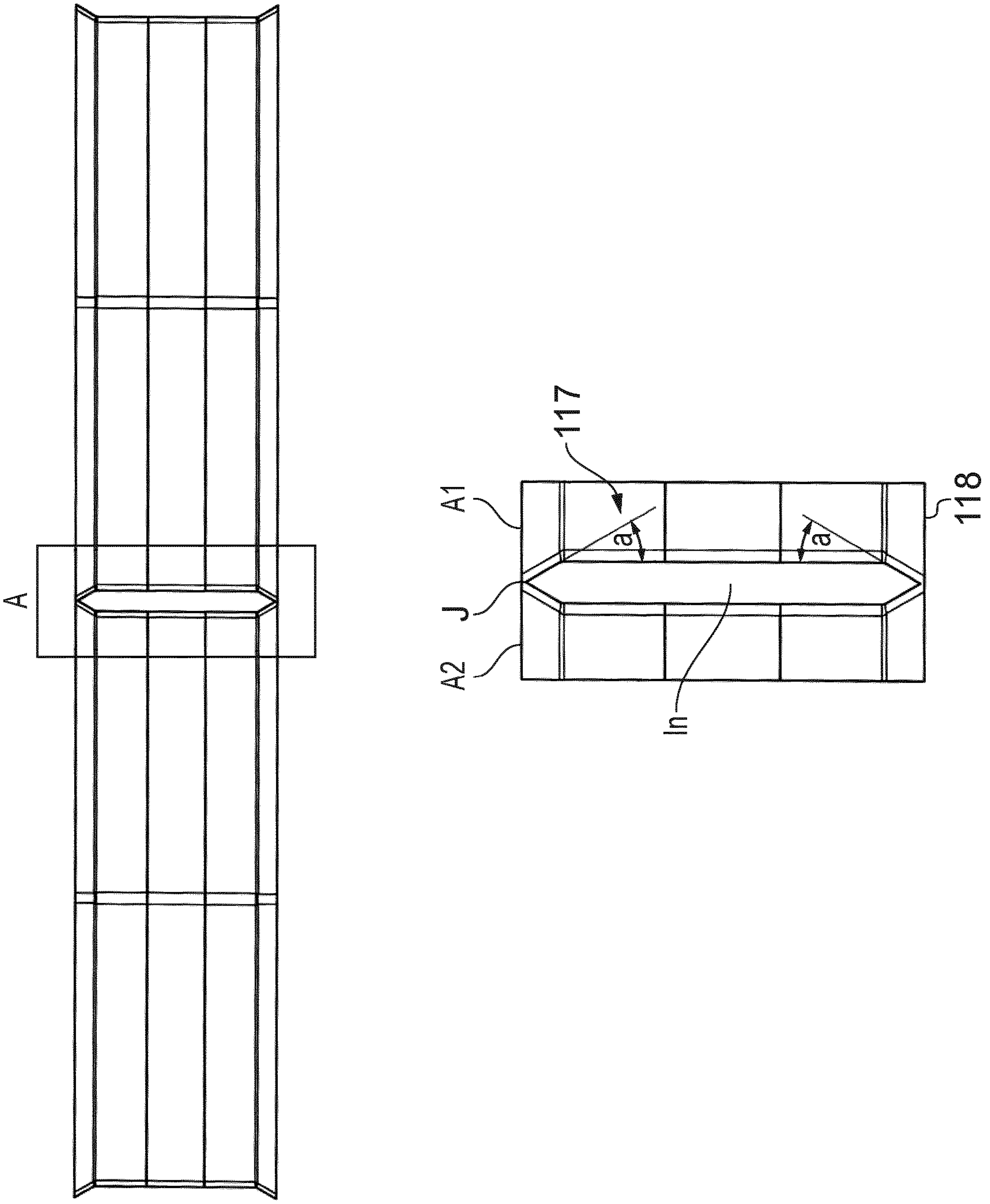

FIG. 112C illustrates the function of the outer and inner rims $R_0$ and $R_i$.

As shown, two adjacent insulations arrangements A1 and A2 are brought into abutment to form part of the tessellating arrangement of the insulation system. The two adjacent arrangements A1 and A2 will come into contact along the straight perimeter lines of the hexagon's shape when tessellating the arrangement.

Here, at point J in FIG. 112C a weld bead can be formed to weld the two arrangements together. The weld itself creates a gas impervious seal preventing any air passing from the cold side of the arrangement to the ambient side. When connecting the arrangement to a tank the welding is arranged on the ambient side of the panel and conversely when the arrangement is arranged on a hull the welding is arranged on the cold side of the panel.

The angle a of the rim allows for some flexibility and movement of the adjacent arrangements A1 and A2. Thermal contraction of the cold side of the panels will tend to pull the two adjacent rims apart. On the ambient side of the panel thermal expansion will tend to bring adjacent rims together.

Advantageously the cold side of the panel or the ambient side of the panel will not be firmly coupled to the tank or hull to allow for thermal movement of the insulation arrangement relative to the tank/hull surface as the tank is emptied (and potentially warmed up) and again filled (and thus cooled down). Advantageously the connection to the tank or the hull is flexible and allows for the relative movement between the tank/hull and the panel.

Because the panels are not firmly connected to the tank and because of the rim of the panel on its cold side, there will be a small void between the tank surface and the insulating panel. The atmosphere of this void will cause condensation due to the very low temperatures of the tank wall facing the insulation if its thermal point of condensation is higher than that of the tanks outer surface. To avoid this, the small void may be filled with a gas that will not condensate at temperatures of that of the outer tank wall, i.e. <–250 degrees C. Such a gas may be Helium (He) or hydrogen ($H_2$). Alternatively, the void may be evacuated of any gas by the introduction of vacuum. The void may also be left without any measures employed for avoiding condensation. In this case, depending on the atmosphere, condensation in the void may occur forming a layer of ice onto the outer surface of the tank and the cold surface of the panel. This layer may grow until the outer surface of this layer facing away from the tank surface reaches a temperature higher than that of the point of condensation of the atmosphere in the void. The formation of ice may act as an insulation layer preventing further formation of ice.

To fully optimise the thermal properties, the void $I_n$ which is formed between adjacent panels may be filled with an insulating material. For example, the void may be filled with polyurethane, a mineral wool, EPS (expanded polystyrene) or other insulating material that can be conveniently located with the void to fill the space. Alternatively, vacuum may be introduced in the void.

Figure 113:
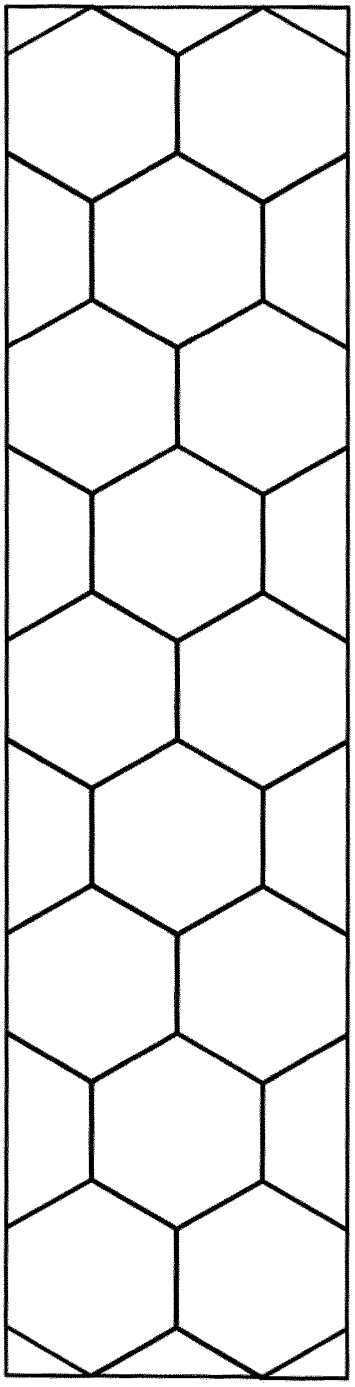
FIGS. 113 and 114 show a plurality of hexagonal panels coupled to form a single unit or bank of panels.
Figure 114:
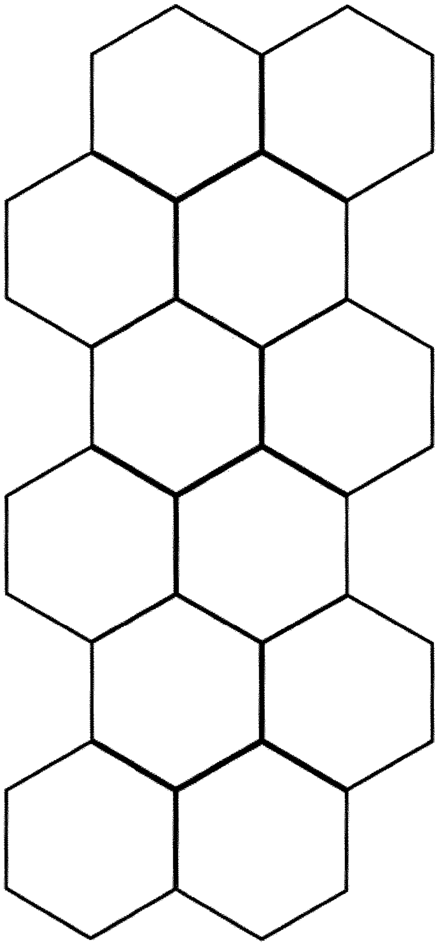

FIGS. 113 and 114 show a plurality of hexagonal panels coupled together for connection to the inner hull of the vessel or outer surface of the tank. In such an arrangement the impermeable seal around the perimeter is only required around the outermost perimeter of the entire arrangement as opposed to the perimeter of individual panels. Thus, a single internal volume of the arrangement may be provided, and a single evacuation valve used. This allows for faster installation and evacuation of the arrangement.

In situations where adjacent groups or pluralities of panels are brought together on a surface then any void between adjacent groups may be advantageously filled with an insulating material such as an expanded foam or the like as described above. Alternatively, vacuum may be introduced in the void.

Furthermore, it facilitates the convenient checking and monitoring of the vacuum level within the arrangement which is important for the thermal performance of the arrangement. In such an arrangement, only a single valve need be checked to determine the internal pressure for a plurality of connected panels. A pressure gauge may additionally or alternatively be installed.

Figure 115A:
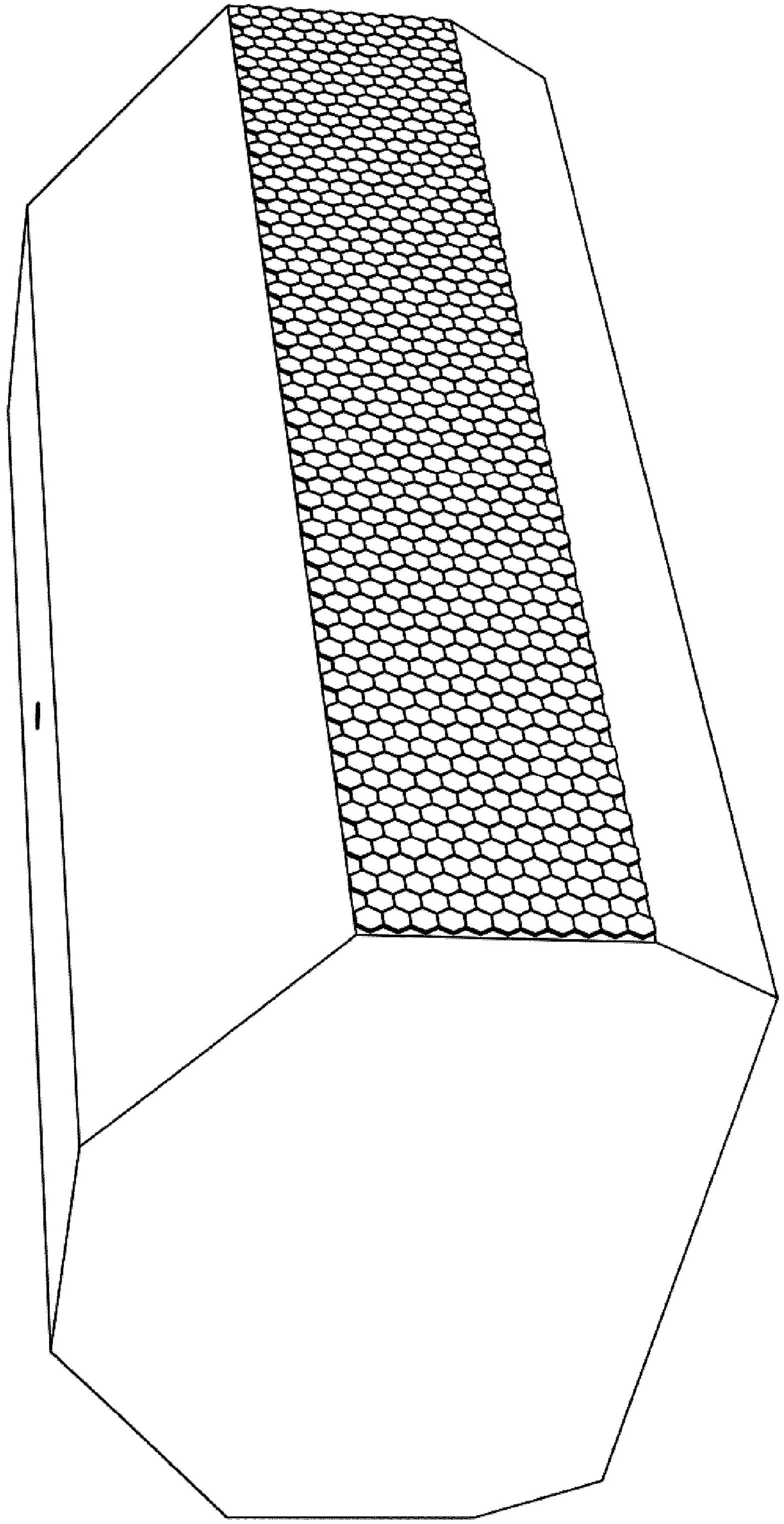
FIG. 115A shows one arrangement of hexagonal panels attached to a tank.

FIG. 115A illustrates the installation of the hexagonal arrangement on the outer surface of a tank.

Figure 115B:
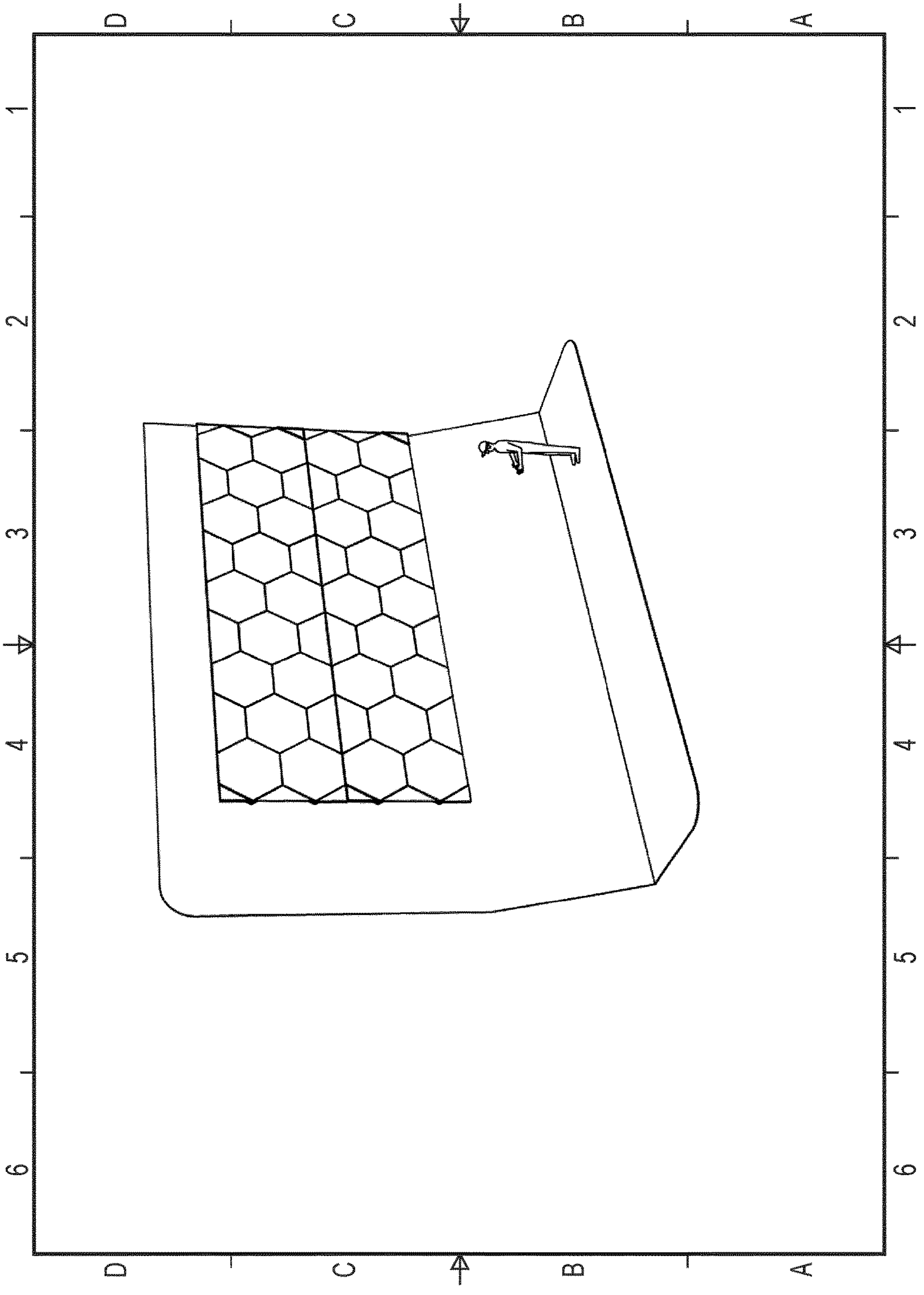
FIG. 115B shows one arrangement of hexagonal panels attached to the inner hull in a room/hold space (cargo area) of a ship.

FIG. 115B illustrates the installation of the hexagonal arrangement on the inner hull in a room/hold space (cargo area) of a ship.

Figure 116:
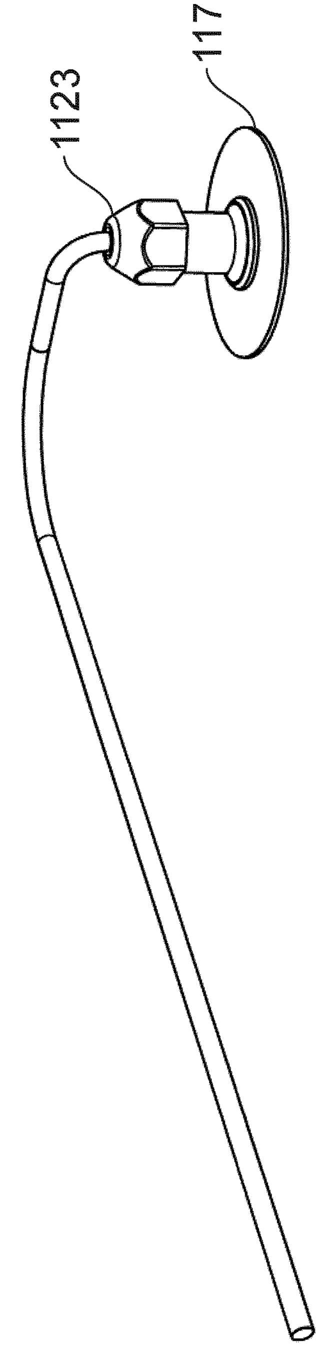
FIG. 116 shows an example vacuum coupling to a panel.

FIG. 116 illustrates a vacuum connection connected to a vacuum valve on a panel and an associated conduit through which air can be evacuated. It will be recognised that a plurality of individual panels or banks of panels could be connected to a single vacuum pump to create one or more vacuum sections. For example, a manifold arrangement may be provided allowing for convenient couplings and maintenance.

Although the example described above relates to a hexagonal panel it will be recognised that the same approach may be used with other shapes which may tessellate. This may, for example, be square or triangular panels. Depending on the geometry of the tank to be insulated, a combination of different shapes may be utilised and tessellated together to provide a complete barrier covering the entire surface of the tank or the inner surface of the vessel's hull. It also follows that the rim and perimeter thermal isolation arrangements many equally be used for different panel shapes.

Monitoring of the insulating arrangement may be achieved using temperature monitoring and/or pressure monitoring.

Each panel or plurality of panels defined by an impermeable seal may be connected to a pressure control and monitoring system and a vacuum pump via the vacuum valve 1113. Divergence between defined vacuum pressure, a default value, and an actual pressure will be monitored. A vacuum pump connected to the grid, or bank, of panels will activate and restore default vacuum pressure when and if required.

Alternatively, temperature may be applied as the monitoring parameter instead of pressure or in addition to pressure. Temperature measurement can be achieved using sensors such as thermocouples or passively such as infra-red (IR) cameras to monitor variations in temperature between the panels and relative to the desired operating temperature. If the temperature rises above pre-defined default values, loss of vacuum is indicated. A vacuum pump connected to a panel or the grid of pluralities of panels will be activated and restore default vacuum pressure when and if required.

It will be recognised that the insulation arrangements described herein may be used to allow for the transportation of liquefied gases in cargo applications as described above i.e. where large volume tanks are used on ships specifically constructed to carry liquefied gas. The inventors have established that the insulation panel arrangement may also be used in other related applications. For example, the panels might be mounted on the tank itself or, if the tank is not insulated, on the walls/bulkheads in a room/hold-space where the uninsulated tank is placed.

Additionally, or alternatively, an LNG fuel tank may be realised using an insulating arrangement described herein.

Additionally, or alternatively, a liquid hydrogen ($LH_2$) fuel tank may be realised using an insulating arrangement described herein. Thus, clean fuel may be used by providing such an insulated fuel tank which could contain liquefied hydrogen.

The discussion above focusses on the use of the insulation arrangement in purpose-built cargo ships having a large tank as illustrated in FIG. 115 or several large tanks, and as well for fuel tanks (for either LNG/$LH_2$). However, a modular cargo arrangement may also be realised as now described with reference to FIGS. 117 to 120.

Figure 117:
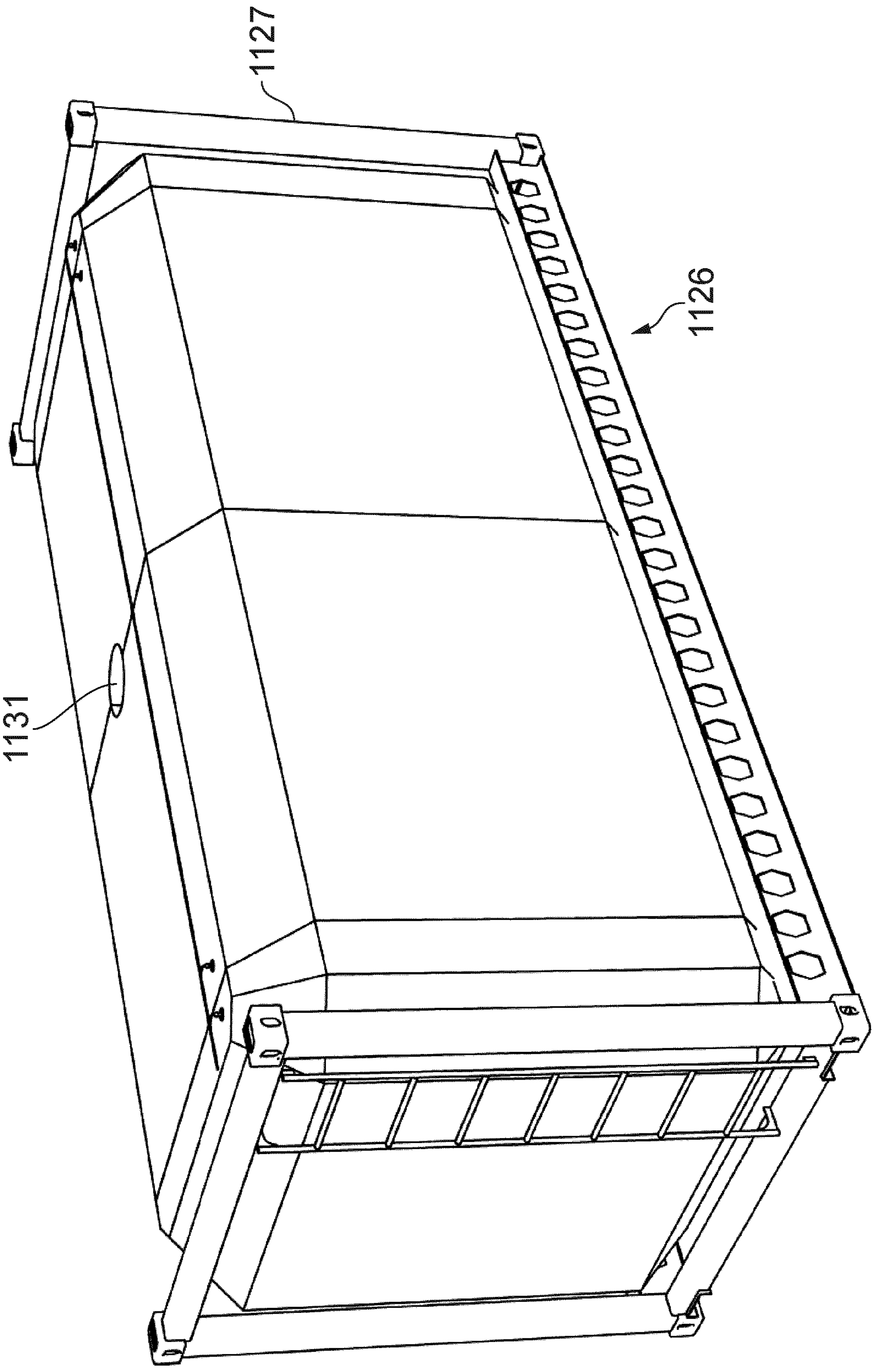
FIG. 117 shows a transport system for liquefied gas incorporating an insulation system described herein.

FIG. 117 shows a liquefied gas transport arrangement incorporating the insulation arrangements described herein. The transport arrangement is arranged to be contained within the dimensions of an ISO standard container, such as but not limited to 20-, 40- or 45-foot-long, including high cube freight container of type used to transport cargo on ships or any other suitable skid-like structure.

Figure 118:
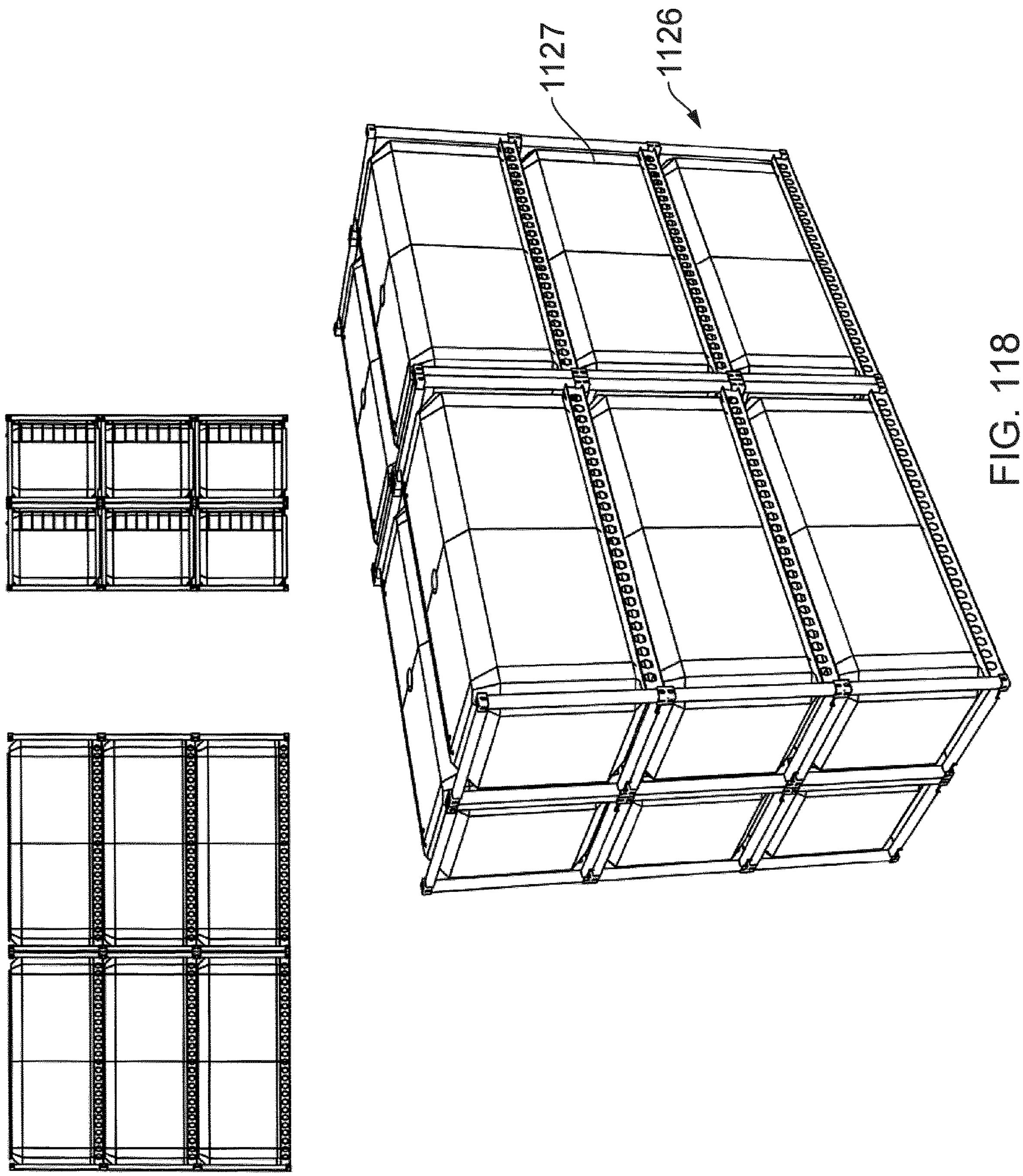
FIG. 118 shows a matrix of the transport system shown in FIG. 117.

The outer structure 1127 is arranged so that separate transport arrangements can be coupled together as shown in FIG. 118. An array of individual liquefied gas transport arrangements can then be secured together for transport, for example, within or on the deck of a cargo ship. In FIG. 118, individual liquefied gas transport arrangements are coupled together to form an array of tanks.

The insulation of the arrangement will now be described with reference to FIGS. 119 and 120.

Figure 119C:
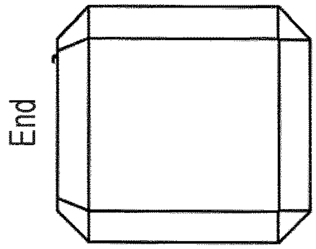
FIGS. 119A, 119B and 119C show plan, side and end elevations of an exploded system as shown in FIG. 117.
Figure 119B:
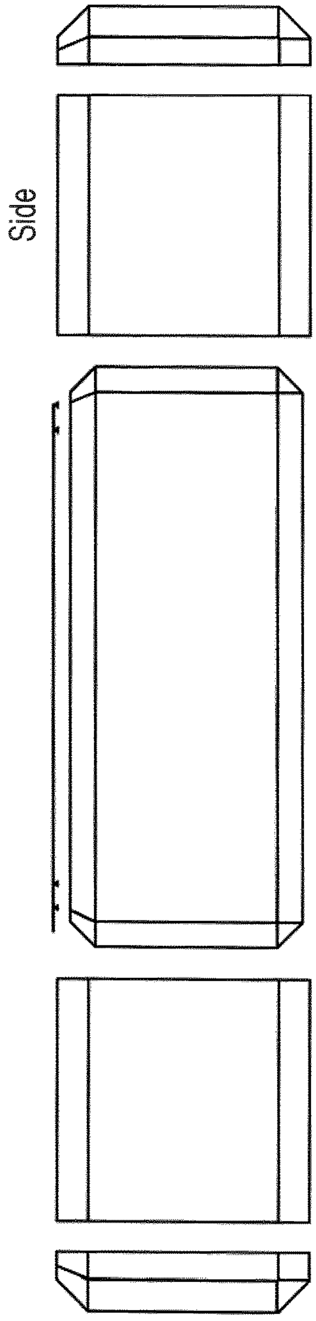
Figure 119A:
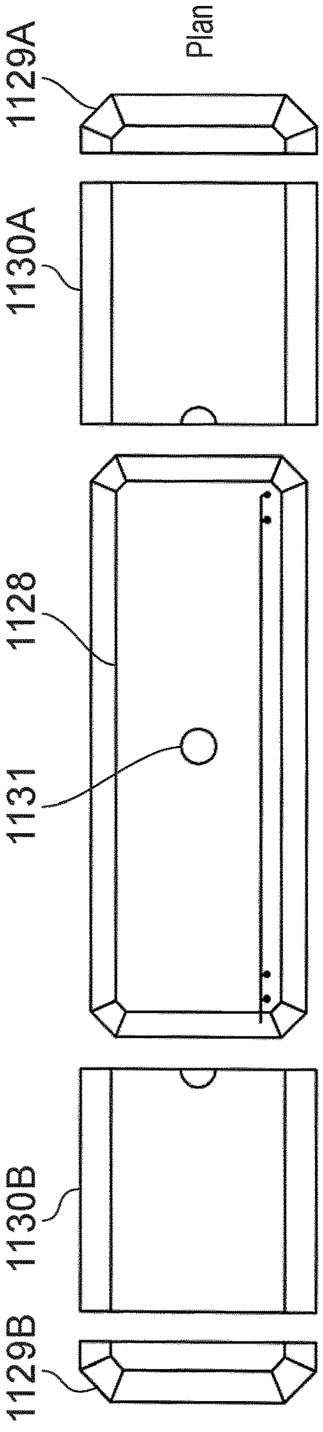

FIG. 119A shows a plan view of the arrangement. FIG. 119B shows a side view and FIG. 119C and end view of the arrangement.

FIG. 119A shows an exploded view of the individual sections making up the insulation layer surrounding the tank. The tank 1128 is arranged to contain the liquefied gas, such as hydrogen ($LH_2$) or LNG. The tank 1128 is surrounded by an insulation layer which is itself formed of sections.

The tank 1128 may be surrounded by end sections 1129A, 1129B and two sleeve sections 1130A, 1130B. The sleeve sections 1130A, 1130B are arranged to slide over the length of the tank. The tank is then 'sealed' by locking the end sections 1129A, 1129B to form an envelope around the tank 1128. Referring to FIG. 117 the encased tank is shown with an access port 1131 for loading and unloading.

The insulation layer may be in the form of a tessellated arrangement of individual panels as described herein. However, the sleeves of the arrangement shown in FIG. 119A-119C allow longer section of insulation layers having the same vacuum internal cavity to be used and conveniently manufactured. As described herein the spacing elements may be used to provide the structural support needed to the insulation as the vacuum is drawn within the layer.

The spacing elements may be discrete elements or may be elongate members extending along the length of the sleeves (and within the space defined between tank facing layer and outwardly facing layer). This allows for convenient manufacture such as by extruding.

Figure 120:
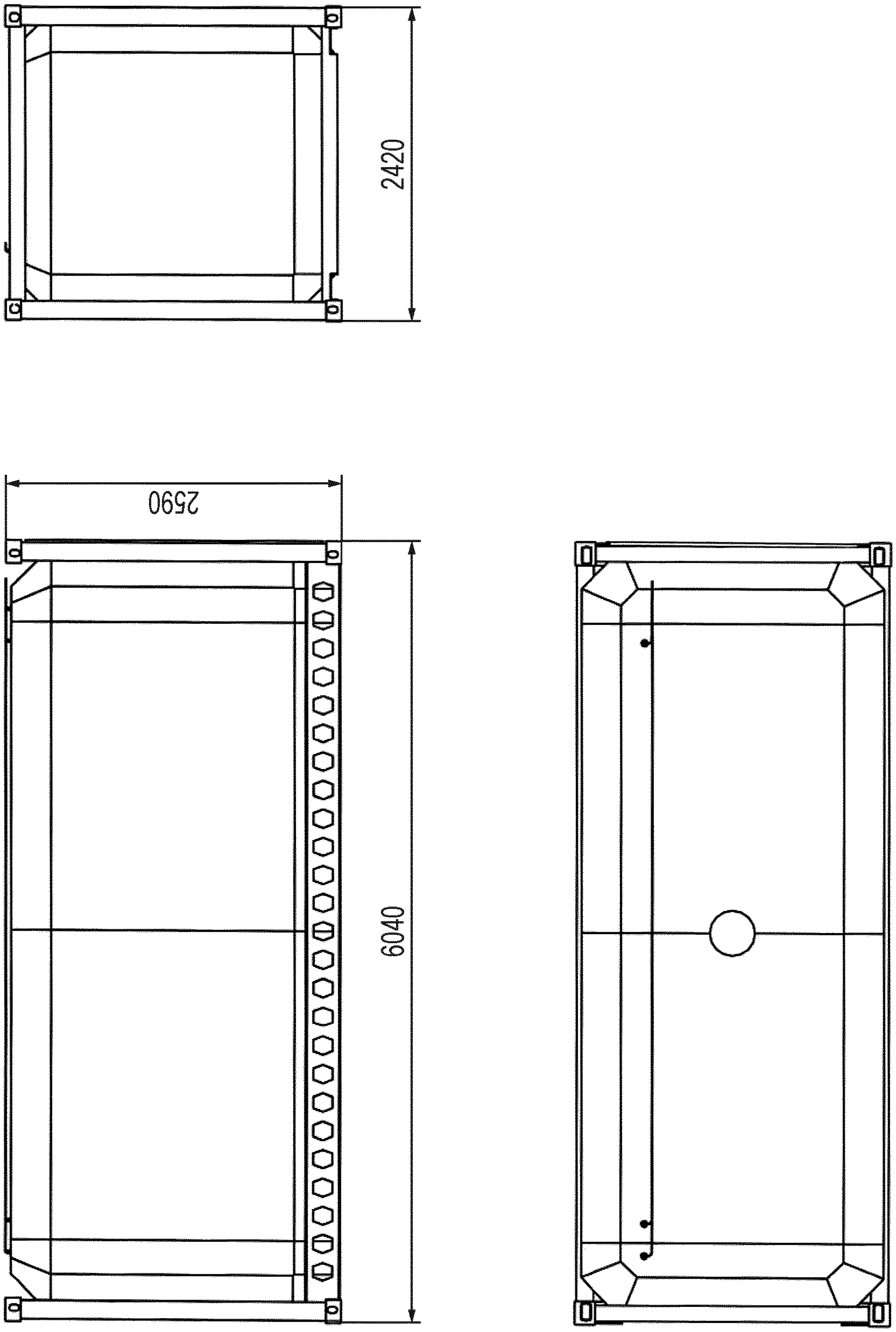
FIG. 120 illustrates example dimensions of the system.

FIG. 120 shows the side, end and plan view of the arrangements with suitable dimensions to conform to the sizes of containers used on cargo ships and in international transportation. Thus, the arrangement can conveniently work using conventional logistics systems without the need for special equipment or geometries for loading and unloading.

In another arrangement the tank 1128 may be cylindrical and the sleeves corresponding cylindrical to surround the cylindrical tank. The end portions would then be two opposing concave insulation 'caps' on either end of the tank.

The arrangements described herein relating to vacuum, temperatures sensing and boil-off handling/management, may be conveniently arranged within the outer boundary of the container, for example when a single container is used. Alternatively, multiple containers may be connected to a primary container which houses the controlling and monitoring equipment for vacuum, temperature sensing and boil-off arrangement, for example when multiple containers are used together. Alternatively, this may be arranged integrated with other relevant onboard control arrangements.

It will also be recognised that each container may be provided with suitable conduits and connectors allowing the vacuum to be drawn from multiple container insulation arrangements from a single vacuum source. Electrical connections may similarly be provided for communicating power and temperature/pressure information between containers. Thus, a fully modular system of containers may be realised.

The invention described herein may, as mentioned, also be used for fuel tank applications for ships.

In any of above configurations, the arrangement may include a boil-off management system limiting the increasing pressure in the tank developing as liquid vaporises into gas, ensuring it stays within safe levels. This may include re-liquefaction for re-injection.

Still further examples of the insulation and transportation according to inventions described herein are set out with reference to FIGS. 121, 122 and 123.

The insulation arrangement described above is formed of a plurality of discrete units which can be closely aligned on either the tank surface and/or on the hull surface as described above.

This is further illustrated with reference to FIG. 121 which shows a cross-section of a liquefied gas carrying vessel including the superstructure of the vessel above the cargo holding tank(s). Here, the vessel 32 comprises a tank 33 (which is Primary barrier: Self-supporting, prismatic, IMO independent tank type A, type B, or alternatively a novel tank design) in which the liquefied fuel is loaded and contained during transportation. The tank 33 is supported within the structure of the vessel 32 by a plurality of supports or 'feet' 34. The support members 34 (which are cargo tank supports: Special design for the extreme temperature of $LH_2$ (−253 degrees C.) on which the tank rests), provide support for the tank 33 and also provide a thermal break between the cold tank and the lower structure and surface of the hull. This is described further below.

FIG. 121 also illustrates the primary insulation layer 35 which is arranged proximate to and coupled to the tank 33 as described above with reference to the panels. A secondary insulation layer 36 is also illustrated and may be arranged proximate to and coupled to the inner hull or hull of the ship. The independent secondary insulation layer 36 provide redundancy and represents and additional risk mitigating layer.

Hydrogen appears in a liquid state at −253 degrees C. as $LH_2$. Thus, the containment of $LH_2$ will require the maintenance of a low temperature, i.e. $<-250$ degrees C. Nitrogen liquefies (or boils) at −196 degrees C. In order to enable the use of $N_2$ for surveillance/monitoring in/of the void 37 between the primary insulation layer 35 and the secondary insulation 36 on the hull or inner hull wall, the temperature in the void 37 must be higher than the boiling point of $N_2$. Therefore, on-tank insulation, the primary insulation layer 35 is required.

The primary insulation layer 35 may be that of Polyurethane (PU) spray foam, vacuum panels, PU panels w/ plywood or any other suitable insulating material. Similarly, the secondary insulation panel if applied may be that of Polyurethane (PU) spray foam, vacuum panels, PU panels w/ plywood or any other suitable insulating material. The secondary insulation layer 36 may cover the entire hold space and submerging the tank supports.

To reduce the thermal efficiency requirements of the insulation containment system as described and consisting mainly of the primary and secondary insulation layer if applied, a cooling arrangement may be installed in the tank or primary barrier 33 itself. This can provide redundancy and represents a further additional risk mitigating layer. Such a cooling arrangement may include a cryogenic refrigerator with an internal heat exchanger.

A perfect contact between the primary insulation layer and tank and the secondary insulation layer and (inner) hull is unlikely to be achieved and consequently a small separation will occur between respective insulation panels and surfaces creating voids. The void between the tank and the primary insulation layer 35 will when the tank is carrying a load such as $LH_2$, hold a temperature marginally higher than that of the load. In cases where this gap is occupied by air containing oxygen and nitrogen, these two components will condensate at −183 and −196 C respectively creating the formation of ice.

The Void between Tank (VbT) and an adjacent surface of primary insulation panels may be provided as shown in FIG. 121 (referred to as $V_1$ in FIG. 122). As the temperature in the VbT/$V_1$ will be lower than the boiling/condensing point of e.g. mixed atmospheres of $O_2$ and $N_2$, condensation and consequently the formation of ice will occur. To prevent this, the void may be filled with a gas with a boiling point/point of condensation which is lower than that of the temperature in the void (VbT/V1) itself. Two gaseous candidates are helium (He) (which boils/condenses at a temperature of approximately −269 degrees C.) and hydrogen ($H_2$) (which boils/condenses at a temperature of approximately −253 degrees C.). A third option is to create a vacuum in the void VbT/V1. In each of these three scenarios, the contents/atmosphere of the void/cavity are preventing condensing and the formation of ice. It will be recognised that with a vacuum, no gas is present at all. Alternatively, the void may be filled with a gas with a higher temperature than −253 degrees C. This may be a mixture of oxygen or nitrogen. Due to temperatures in the void VbT lower than that of the boiling/condensing point of mixtures of oxygen and nitrogen, resulting condensation will cause the formation of ice. This may be allowed to develop until the layer of ice have developed a sufficient thickness and thermal capacity bringing the temperature in the void below that of the condensation point of the atmosphere in the void (VbT/V1). At this point, condensation and further formation of ice will cease.

The void between the insulation panel and the hull will not be subjected to temperatures as low. This void may be filled with air, nitrogen or helium.

A multi-layered insulation system 38 can thus be created, with the following layers commencing from the tank within the vessel. This is illustrated with reference to FIG. 122, which is a cross-section through part of the insulation layers shown in FIG. 121.

The multi-layer insulation system can be broken down into the following layers:

TABLE 1

| | |
|---|---|
| Layer 1 | The Tank Wall 33 itself - this contains the liquid 34 and acts as the primary barrier or liquid barrier. |
| Layer 2 | The first substantially thin cavity $V_1$ between the tank 33 and the primary insulation layer 35. This may be filled with a suitable gas, such as helium, hydrogen, or a vacuum may be drawn within this thin cavity. It may also be left to allow condensation creating an insulating layer of ice causing temperatures to increase beyond the boiling point/point of condensation of the atmosphere of the void. The couplings connecting the primary insulation layer 35 will extend intermittently across this cavity. This gap may be intentionally created or may be created by virtue of installation tolerances between the primary insulation and the tank. |
| Layer 3 | The primary insulation layer 35 itself. This may be a plurality of tessellating panels (as described above) or it may in some arrangements be a Polyurethane layer or the like, for example in panel form or sprayed on to the tank. |
| Layer 4 | The Void 37. This may similarly be filled with a suitable gas such as helium or nitrogen. |
| Layer 5 | The secondary insulation layer 36 itself. This may be a plurality of tessellating panels (as described above) or may in some arrangements be a Polyurethane layer or the like, for example in panel form or sprayed on to the tank. |
| Layer 6 | The Void $V_2$. This may similarly be filled with a suitable gas such as helium or nitrogen. However, because it will not be exposed to extremely low temperatures, air/nitrogen enriched air may also be used. In an arrangement where a sprayed polyurethane layer is used a void V2 may be avoided. |
| Layer 7 | The hull or inner hull wall which may represent the wall member/bulkhead representing the separation of the hold from the ballast tanks 38. |

TABLE 2

| | Tank Insulation | Hull/inner hull Insulation |
|---|---|---|
| 1 | Multiple Panel | Polyurethane |
| 2 | Polyurethane | Multiple Panel |
| 3 | Multiple Panel | Multiple Panel |
| 4 | Polyurethane | Polyurethane |

The inventors have established that the lowest thermal performance is achieved with a polyurethane/polyurethane pairing and that an optimal thermal performance is achieved with a multiple(tessellating) panel/multiple panel (as described with reference to FIGS. 1 to 20). Still further a vacuum arrangement in such panels provides the best thermal performance.

It will thus be recognised with reference to table 1, table 2 and to FIG. 122, that a complex thermal arrangement may be provided for a vessel according to an invention described herein.

Advantageously the thermal properties of each layer may be optimised for the particular cargo. Furthermore, manufacturing and installation may be simplified and adapted to create the multiple void layers. Lower manufacturing tolerances allow for higher tolerances on tank and hull geometries whilst simultaneously providing the additional void layers.

FIG. 123 illustrates the support member or 'feet' 34 shown in FIG. 121.

The support member 34 provide the functions of support of the tank allowing it to rest and slide following thermal expansion/contraction. It also act as a thermal break to prevent heat from the surroundings being conducted to the tank. Additionally, to maintain the integrity of the void described above, the surrounds to each support or foot must be sealed to prevent gas escape, ingress or loss of vacuum.

This is achieved using a load bearing thermal break main member 40. This is located on a lower surface against the hull and its associated structural members and on an upper surface against the tank.

As described above, helium or other suitable gases may be used in the Voids between Tank as a mitigating measure against condensation and ice formation. In such an arrangement an additional supply-system of e.g. helium and thus a piping/valve arrangement to the individual voids may be provided. The perimeter of each void may then be sealed to prevent ingress/egress of the chosen gas, such as helium.

FIG. 123 illustrates the coupling between the tank and the lower surface of the hull i.e. the way in which the tanks are both supported and importantly insulated.

FIG. 123 shows a single of the plurality of the support members 34 show in FIG. 121. As shown the foot arrangements comprises a thermal break main member 40 which provides a connection between the tank wall 33 and the hull. This may be made of any suitable material including, for example, a wood. Aspects of an invention described herein include the arrangement described in FIG. 123 wherein one or more of the components may be optional included.

As shown, the primary thermal insulation layer 35 is arranged to follow the side contours of a steel support structure 41 which extends from the thermal break 40 to the tank 33. This contour of layer 35 provide continuity of insulation around the foot structure To provide a gaseous seal so as to seal the thermal bridge/tank support 40 a metal welded cap or hat 42 is welded to the inner surface of a metal outer layer 43 of the insulation panel or layer 36. The weld surrounds the foot thereby providing a gaseous seal to maintain the integrity of the void 37 which may, as described above, be filled with an inert gas such as nitrogen.

The inventors have also established that the panel and insulation arrangements described herein, including the multiple insulation layer and void arrangement may also be applied to a spheroid tank, in effect a football or prolate spheroid shape wherein each planar surface of the spheroid corresponds to a panel described herein. The panels may comprise a variety of numbers of sides, including pentagonal shapes and hexagonal shapes, each welded or coupled together.

Viewed from another aspect there is provided a modular insulation arrangement for a ship comprising one or more tessellating insulation units as described herein arranged against or proximate to a cargo containing tank of the ship and defining a primary insulation layer and a secondary insulation layer, spaced from said first layer, and defining a space therebetween.

The second layer may also be a plurality of tessellating insulations units or a layer or polyurethane (for example sprayed). In cases were the arrangement is not used for LH2 but e.g. LNG, the second insulation layer may not be necessary.

A gap or cavity between the one or more tessellating insulation units and the cargo containing tank and of the ship may be filled with a gas selected from helium or hydrogen or alternatively a vacuum may be applied.

The invention claimed is:

1. A prismatic tank for the containment of a liquefied gas, the tank comprising a plurality of substantially planar side walls defining two opposing ends, two opposing sides and an upper surface opposing a lower surface, the planar side walls defining a volume for containing a liquefied gas, the prismatic tank further comprising edge portions at the intersection of the planar side walls and an outer insulation layer arranged on the outer surfaces of the substantially planar surfaces and on the outer surfaces of the edge portions, wherein the edge portions and the planar side walls are extrusions, and wherein the insulation layer is in the form of a modular insulation arrangement comprising one or more tessellating insulation units, each unit comprising a first inwardly facing layer and a second outwardly facing layer spaced from the first layer, the two layers defining a space there between and one or more spacing members extending between the first and second layers, and wherein the surfaces defining the first layer, the second layer and the outer perimeter extending around the arrangement are air impermeable surfaces.

2. A prismatic tank as claimed in claim 1, wherein the extrusions are a common material.

3. A prismatic tank as claimed in claim 2, wherein the common material is aluminium or an alloy thereof.

4. A prismatic tank as claimed in claim 1, wherein the planar side walls are formed of multiple extrusions welded together.

5. A prismatic tank as claimed in claim 1, wherein each edge portion has a cross-sectional shape having a first edge for connection to a first side wall and a second edge for connection to an adjacent side wall, the first and second edges being arranged at 90-degrees to one another and wherein the first and second edges define a weld line along which a side wall may be welded.

6. A prismatic tank as claimed in claim 5, wherein the weld lines are each displaced from the intersection point of the first side wall and adjacent side wall by at least 10 cm.

7. A prismatic tank as claimed in claim 1, wherein the edge portions in cross-section are in the form of two perpendicular portions, the perpendicular portions being for connection to an associated planar side wall, and an intermediate portion connecting the two perpendicular portions, wherein the intermediate portion is arranged at 45 degrees to each of the two perpendicular portions.

8. A prismatic tank as claimed in claim 7, wherein a radius is provided at the point at which the intermediate portion intersects with a perpendicular portion.

9. A prismatic tank as claimed in claim 1, wherein the edge portions and planar side walls are connected together by a friction stir weld.

10. A prismatic tank as claimed in claim 1, wherein the insulation layer comprises an insulation foam.

11. A prismatic tank as claimed in claim 1, wherein the insulation layer is in the form of a plurality of tessellating insulation panels.

12. A prismatic tank as claimed in claim 1, wherein the space between the first and second layers and the surface defining the outer perimeter of the arrangement defines an internal volume to the arrangement and wherein the spacing members are arranged in use to resist atmospheric pressure acting on the surfaces when the internal volume is evacuated of air.

13. A prismatic tank as claimed in claim 1, wherein the prismatic tank is in the form of a pressure vessel.

14. A prismatic tank as claimed in claim 13, wherein the structure is configured to contain a pressure in excess of 2 barg.

15. A prismatic tank as claimed in claim 13, further comprising internal longitudinal and/or transverse reinforcement support members extending between the inner surfaces of the tank.

16. A prismatic tank as claimed in claim 1, wherein the prismatic tank is contained within an ISO container frame complying with ISO dimension regulations.

17. A prismatic tank as claimed in claim 1, further comprising a peripheral frame allowing for selective coupling to similar frames such that multiple prismatic tanks may be coupled together in stacks or matrices.

18. A prismatic tank as claimed in claim 1, comprising an inlet and outer port to allow cargo and/or fuel to be loaded into the tank and removed therefrom.

19. A prismatic tank array comprising a plurality of prismatic tanks as claimed in claim 1.

20. A prismatic tank array as claimed in claim 19, wherein multiple tanks are in fluid communication with each other to allow for simultaneous and/or sequential loading and unloading.

21. A fuel tank for a ship in the form of a prismatic tank as claimed in claim 1.

22. A fuel tank for a ship as claimed in claim 21, further comprising a collection tank or drip tray arranged around the base of the tank and extending partially around the lower periphery of the tank and extending partially towards the top of the tank.

* * * * *